(12) United States Patent
Srivastava et al.

(10) Patent No.: US 10,628,695 B2
(45) Date of Patent: Apr. 21, 2020

(54) FAST ITEM IDENTIFICATION FOR CHECKOUT COUNTER

(71) Applicant: Mashgin Inc., Mountain View, CA (US)

(72) Inventors: Abhinai Srivastava, Palo Alto, CA (US); Mukul Dhankhar, Palo Alto, CA (US)

(73) Assignee: Mashgin Inc., Palo Alto, CA (US)

( * ) Notice: Subject to any disclaimer, the term of this patent is extended or adjusted under 35 U.S.C. 154(b) by 99 days.

(21) Appl. No.: 16/104,087

(22) Filed: Aug. 16, 2018

(65) Prior Publication Data

US 2019/0005343 A1   Jan. 3, 2019

Related U.S. Application Data

(63) Continuation-in-part of application No. 15/685,455, filed on Aug. 24, 2017, which is a
(Continued)

(51) Int. Cl.
*G06K 9/00* (2006.01)
*G06K 9/34* (2006.01)
(Continued)

(52) U.S. Cl.
CPC ......... *G06K 9/00993* (2013.01); *G06K 9/346* (2013.01); *G06K 9/6292* (2013.01); *G06K 9/66* (2013.01); *G06K 9/00624* (2013.01)

(58) Field of Classification Search
CPC . G06K 9/00993; G06K 9/346; G06K 9/00624
See application file for complete search history.

(56) References Cited

U.S. PATENT DOCUMENTS

| 6,295,367 B1 | 9/2001 | Crabtree et al. |
| 6,990,228 B1 | 1/2006 | Wiles et al. |

(Continued)

FOREIGN PATENT DOCUMENTS

| DE | 19536294 A1 | 4/1997 |
| DE | 102014111656 A1 | 2/2016 |

(Continued)

OTHER PUBLICATIONS

"International Application Serial No. PCT US2018 022644, International Search Report dated Jun. 7, 2018", 2 pgs.
(Continued)

*Primary Examiner* — Ruiping Li
(74) *Attorney, Agent, or Firm* — Jeffrey Schox; Diana Lin

(57) ABSTRACT

Methods, systems, and computer programs are presented for on-the-fly image recognition of an item in motion. One method includes an operation for periodically capturing images, by several cameras, of a recognition area. Further, the method includes detecting that the item is present in the recognition area and selecting a recognition window that defines a period of time for analysis. The recognition window defines recognition frames corresponding to the images captured within the recognition window. Each recognition frame is analyzed to determine if an identity of the item has been obtained for the recognition frame, the analysis being based on image recognition of the recognition frame to identify the item based on, at least, a shape of the item and coloring of the item. Further, the method includes operations for determining if the item has been identified based on the analysis for the recognition frames, and for displaying the item identification.

20 Claims, 16 Drawing Sheets

Related U.S. Application Data continuation-in-part of application No. 15/497,730, filed on Apr. 26, 2017, now Pat. No. 10,467,454.

(51) Int. Cl.
*G06K 9/66* (2006.01)
*G06K 9/62* (2006.01)

(56) References Cited

U.S. PATENT DOCUMENTS

| | | | |
|---|---|---|---|
| 9,258,550 | B1 | 2/2016 | Sieracki et al. |
| 9,327,406 | B1 | 5/2016 | Hinterstoisser et al. |
| 2003/0080190 | A1* | 5/2003 | Tsikos ............ G02B 26/10 235/462.01 |
| 2005/0052535 | A1 | 3/2005 | Hamadi |
| 2005/0088529 | A1 | 4/2005 | Geng |
| 2005/0163382 | A1 | 7/2005 | Herley |
| 2005/0189411 | A1 | 9/2005 | Ostrowski et al. |
| 2006/0043174 | A1 | 3/2006 | Banavar et al. |
| 2006/0208169 | A1 | 9/2006 | Breed et al. |
| 2008/0252985 | A1 | 10/2008 | Zhu et al. |
| 2009/0059270 | A1 | 3/2009 | Opalach et al. |
| 2009/0268967 | A1 | 10/2009 | Simon et al. |
| 2010/0059589 | A1 | 3/2010 | Goncalves et al. |
| 2010/0166294 | A1 | 7/2010 | Marrion et al. |
| 2010/0217678 | A1 | 8/2010 | Goncalves |
| 2010/0232681 | A1 | 9/2010 | Fujieda et al. |
| 2013/0010081 | A1 | 1/2013 | Tenney et al. |
| 2013/0223673 | A1 | 8/2013 | Davis et al. |
| 2013/0314541 | A1 | 11/2013 | Lord et al. |
| 2014/0034731 | A1 | 2/2014 | Gao et al. |
| 2014/0036630 | A1 | 2/2014 | Herwlg |
| 2015/0009214 | A1 | 1/2015 | Lee et al. |
| 2015/0023555 | A1 | 1/2015 | Okamura et al. |
| 2015/0066201 | A1 | 3/2015 | Wubbena et al. |
| 2015/0109451 | A1 | 4/2015 | Dhankhar |
| 2015/0310601 | A1* | 10/2015 | Rodriguez ............ G06K 9/209 348/150 |
| 2016/0063821 | A1 | 3/2016 | Macintosh et al. |
| 2016/0110913 | A1 | 4/2016 | Kosoy et al. |
| 2016/0269714 | A1 | 9/2016 | Rhemann et al. |
| 2016/0364634 | A1 | 12/2016 | Davis et al. |
| 2017/0054965 | A1 | 2/2017 | Raab et al. |
| 2017/0278308 | A1 | 9/2017 | Bleiweiss et al. |
| 2018/0103209 | A1 | 4/2018 | Fischler et al. |
| 2018/0314877 | A1 | 11/2018 | Srivastava et al. |

FOREIGN PATENT DOCUMENTS

| | | |
|---|---|---|
| JP | 2009042082 A | 2/2009 |
| JP | 2013186548 A | 9/2013 |
| WO | WO-2012128754 A1 | 9/2012 |
| WO | 2018200090 A1 | 11/2018 |

OTHER PUBLICATIONS

"International Application Serial No. PCT US2018 022644, Written Opinion dated Jun. 7, 2018", 5 pgs.

"International Application Serial No. PCT US2018 022612, International Search Report dated Jun. 8, 2018", 2 pgs.

"International Application Serial No. PCT US2018 022612, Written Opinion dated Jun. 8, 2018", 5 pgs.

"International Application Serial No. PCT US2018 023132, International Search Report dated Jun. 8, 2018", 2 pgs.

"International Application Serial No. PCT US2018 023132, Written Opinion dated Jun. 8, 2018", 6 pgs.

"U.S. Appl. No. 14/517,634, Examiner Interview Summary dated Nov. 28, 2017", 2 pgs.

"U.S. Appl. No. 14/517,634, Final Office Action dated Jul. 21, 2016", 15 pgs.

"U.S. Appl. No. 14/517,634, Final Office Action dated Oct. 18, 2017", 15 pgs.

"U.S. Appl. No. 14/517,634, Non Final Office Action dated Jan. 5, 2016", 18 pgs.

"U.S. Appl. No. 14/517,634, Non Final Office Action dated Mar. 13, 2017", 17 pgs.

"U.S. Appl. No. 14/517,634, Non Final Office Action dated May 15, 2018", 16 pgs.

"U.S. Appl. No. 14/517,634, Response filed Jul. 5, 2016 to Non Final Office Action dated Jan. 5, 2016", 13 pgs.

"U.S. Appl. No. 14/517,634, Response filed Jul. 11, 2017 to Non Final Office Action dated Mar. 13, 2017", 13 pgs.

"U.S. Appl. No. 14/517,634, Response filed Oct. 21, 2016 to Final Office Action dated Jul. 21, 2016", 13 pgs.

"U.S. Appl. No. 14/517,634, Response filed Nov. 27, 2017 to Final Office Action dated Oct. 18, 2017", 14 pgs.

"U.S. Appl. No. 14/517,634, Response Filed Aug. 15, 2018 to Non Final Office Action dated May 15, 2018", 18 pgs.

"U.S. Appl. No. 15/497,730, Non Final Office Action dated Oct. 18, 2018", 20 pgs.

"European Application Serial No. 18161853.9, Extended European Search Report dated Sep. 19, 2018", 8 pgs.

"European Application Serial No. 18161854.7, Extended European Search Report dated Oct. 9, 2018", 8 pgs.

"European Application Serial No. 18161856.2, Partial European search report dated Oct. 22, 2018", 14 pgs.

\* cited by examiner

FAST ITEM IDENTIFICATION FOR CHECKOUT COUNTER

CLAIM OF PRIORITY

This application is a Continuation-in-part Application of U.S. patent application Ser. No. 15/685,455, entitled "Separation of Objects in Images From Three-Dimensional Cameras," filed on Aug. 24, 2017, which is a Continuation-in-part Application of U.S. patent application Ser. No. 15/497,730, entitled "Synchronization of Image Data from Multiple Three-Dimensional Cameras for Image Recognition," filed on Apr. 26, 2017, all of which are incorporated herein by reference in their entirety.

TECHNICAL FIELD

The subject matter disclosed herein generally relates to methods, systems, and programs for object recognition and, more particularly, methods, systems, and computer programs for object recognition using multiple cameras.

BACKGROUND

Visually recognizing items is one of those tasks that is very simple for humans but very difficult for machines. Some solutions for visual recognition require that the item is in a very specific position, limit the number of items that may be recognized, or require that a distinctive mark be placed on the item, such as multi-line barcodes or matrix barcodes.

But these solutions do not solve the general problem of quick recognition of any item from a large number of possible items in an uncontrolled environment where the items may be situated in any position, such as items sold at a checkout counter.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1A:
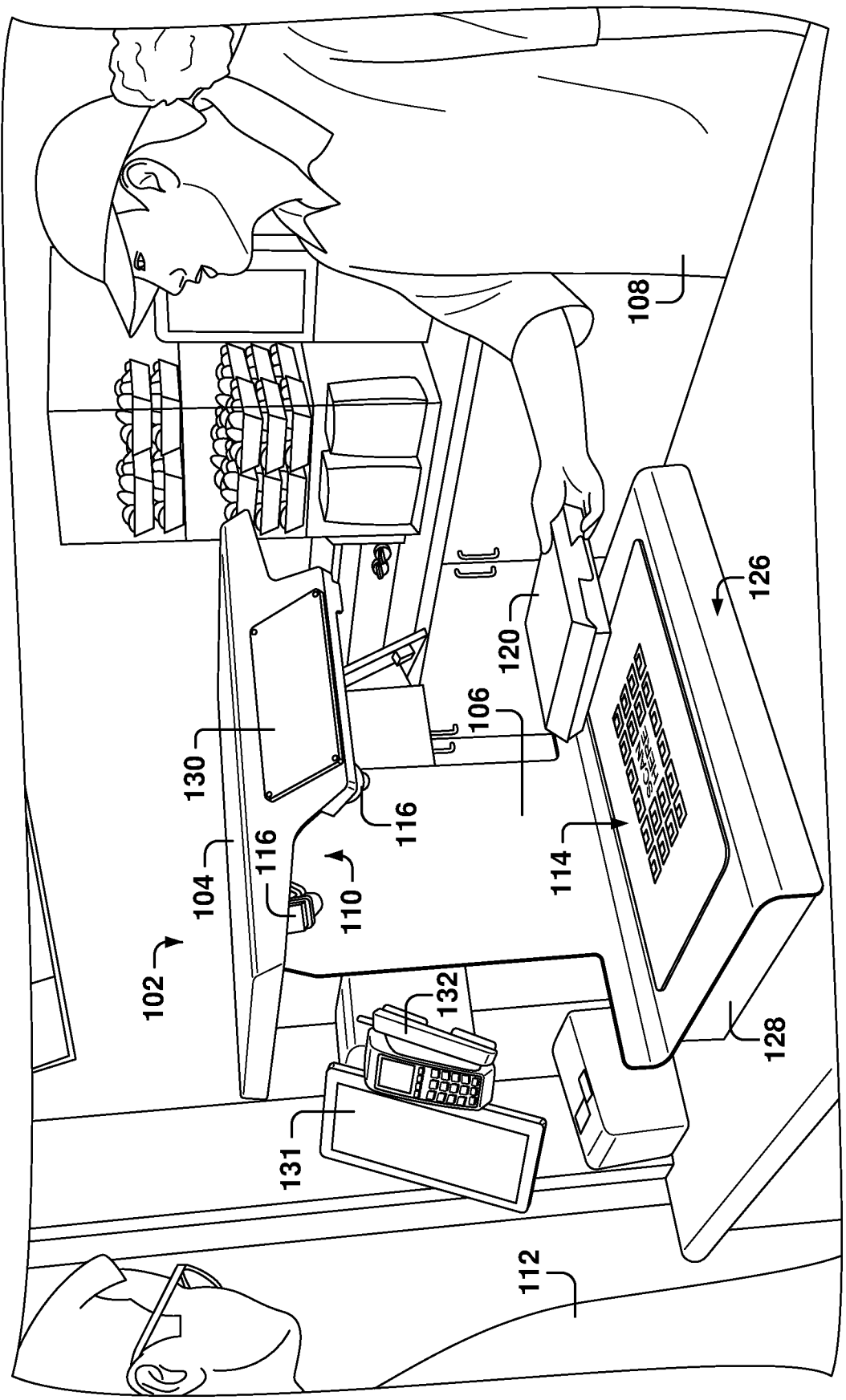
FIGS. 1A-1C illustrate the fast checkout process utilizing on-the-fly image recognition, according to some example embodiments.

Example methods, systems, and computer programs are directed to on-the-fly image recognition of an item in motion. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

The sales process at checkout counters usually requires entering codes for the items purchased, interacting with the customer to identify the price, and then taking cash or credit to pay for the items. When operating at busy sites, such as checkout counters at sports venues or a busy checkout line in a retail warehouse, accelerating the checkout process could greatly reduce the wait lines, increase customer satisfaction, and reduce costs for the retailer.

A high-speed visual item-recognition apparatus is presented for quick checkout operations. The checkout apparatus includes a plurality of high-speed cameras that can recognize items as a user slides the items underneath the cameras. The item does not have to be placed on the surface, and the item recognition is based on recognizing the item without relying on barcodes or other types of markings placed on retail items for item recognition. This process is referred to as on-the-fly item scanning or in-the-air item scanning because an item does not have to be placed on a surface and may be scanned while the item is in motion.

The checkout apparatus further includes a display for the checkout clerk, a display for the customer to show the items scanned and their prices, and a credit card reader for easy payment.

The high-speed checkout apparatus greatly reduces the time required for the customer to check out and simplifies the process because the checkout clerk does not have to enter any codes or try to scan barcodes. The natural motion required to scan articles simplifies and speeds up the checkout process. Additionally, the training of new checkout clerks is greatly simplified because of the ease of use of the checkout apparatus. Further, the checkout apparatus may also be used in retail operations that utilize self checkout, as the process is easy to use for anyone.

Further, the high-speed recognition apparatus may be used in other situations where item recognition is part of a process, such as manufacturing operations, distribution centers, post offices, etc.

In one embodiment, a method is provided. The method includes an operation for periodically capturing images, by a plurality of cameras, of a recognition area defined for identifying an item placed in the recognition area while the item is held by a user. Further, the method includes operations for detecting that the item is present in the recognition area based on the captured images, and for selecting a recognition window that defines a period of time for analyzing the item. The recognition window defines a plurality of recognition frames corresponding to the images that have been captured within the recognition window. Each recognition frame is analyzed to determine if an identity of the item has been obtained for the recognition frame, the analysis comprising performing image recognition of the recognition frame to identify the item based on, at least, a shape of the item and coloring of the item. Further, the method includes an operation for determining if the item has been identified based on the analysis for the plurality of recognition frames. The identification of the item is presented on a display.

In another embodiment, a system includes a plurality of cameras for periodically capturing images of a recognition area defined for identifying an item placed in the recognition area while the item is held by a user, a display, a memory comprising instructions, and one or more computer processors. The instructions, when executed by the one or more computer processors, cause the one or more computer processors to perform operations comprising: detecting that the item is present in the recognition area based on the captured images; selecting a recognition window that defines a period of time for analyzing the item, the recognition window defining a plurality of recognition frames corresponding to the images that have been captured within the recognition window; analyzing each recognition frame to determine if an identity of the item has been obtained for the recognition frame, the analyzing comprising performing image recognition of the recognition frame to identify the item based on, at least, a shape of the item and coloring of the item; determining if the item has been identified based on the analysis for the plurality of recognition frames; and presenting, on the display, the identification of the item based on the determining.

In yet another embodiment, a machine-readable storage medium (e.g., a non-transitory storage medium) includes instructions that, when executed by a machine, cause the machine to perform operations comprising: periodically capturing images, by a plurality of cameras, of a recognition area defined for identifying an item placed in the recognition area while the item is held by a user; detecting that the item is present in the recognition area based on the captured images; selecting a recognition window that defines a period of time for analyzing the item, the recognition window defining a plurality of recognition frames corresponding to the images that have been captured within the recognition window; analyzing each recognition frame to determine if an identity of the item has been obtained for the recognition frame, the analyzing comprising performing image recognition of the recognition frame to identify the item based on, at least, a shape of the item and coloring of the item; determining if the item has been identified based on the analysis for the plurality of recognition frames; and presenting on a display the identification of the item based on the determining.

Figure 1B:
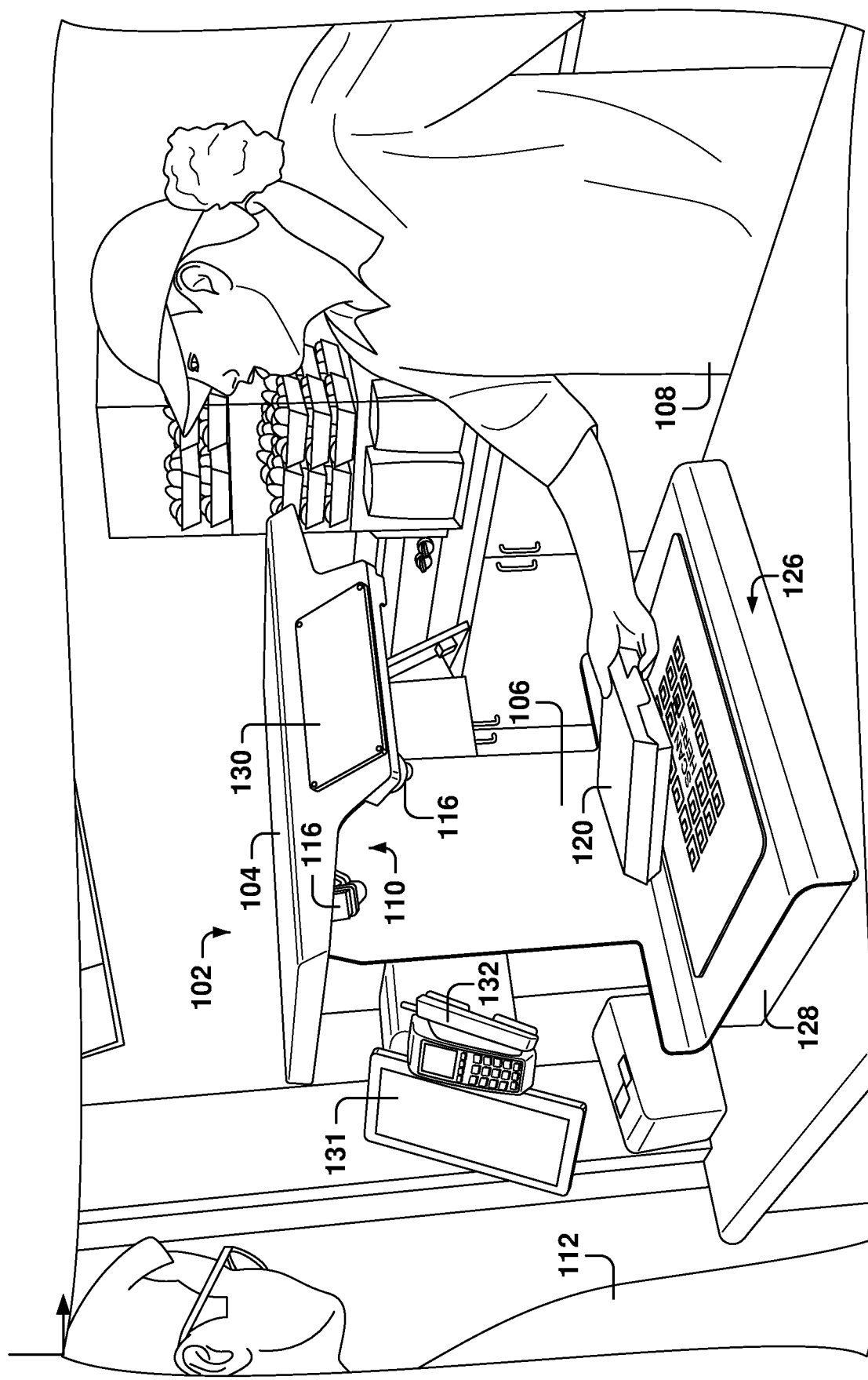
Figure 1C:
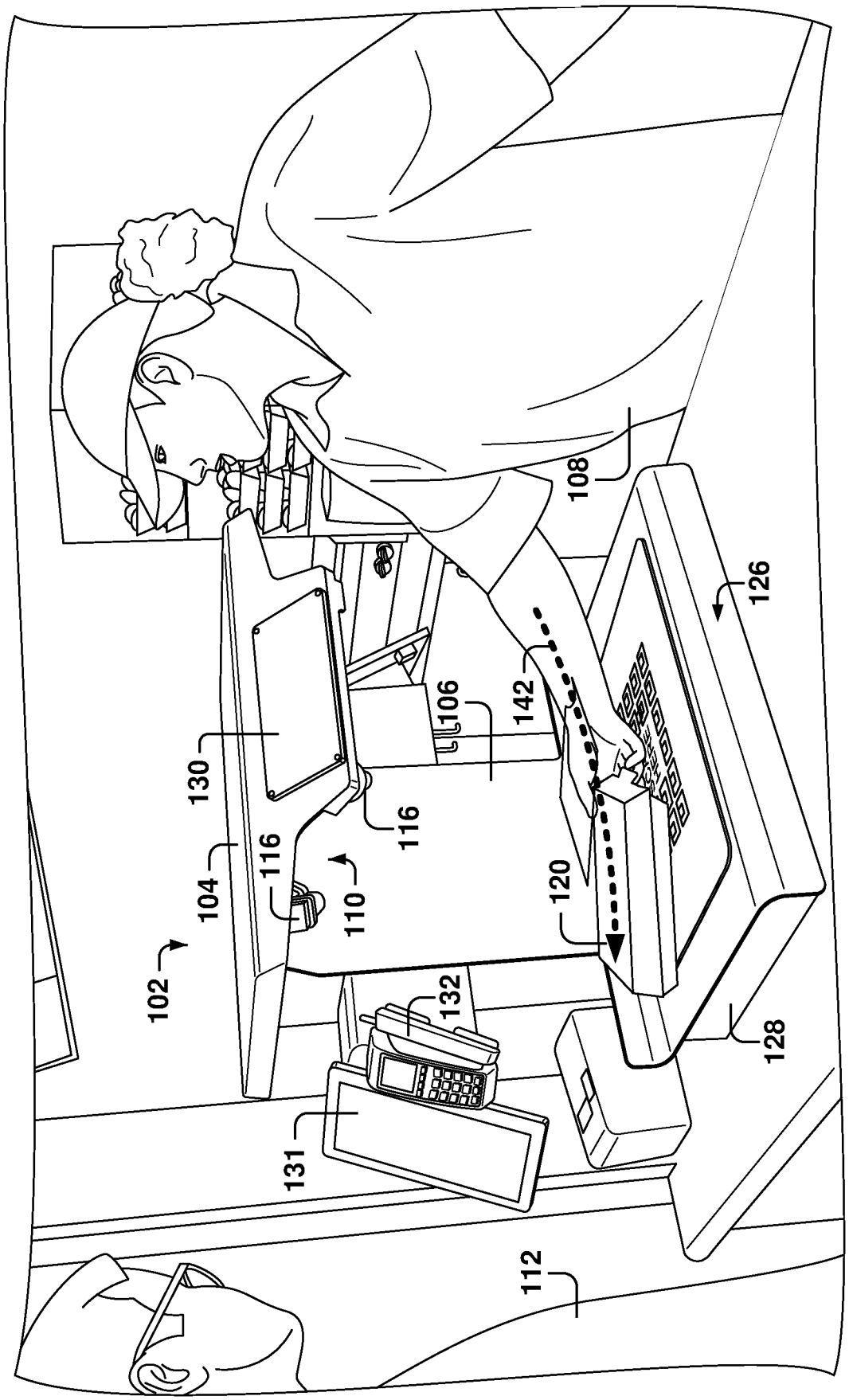

FIGS. 1A-1C illustrate the fast checkout process utilizing on-the-fly image recognition, according to some example embodiments. When making a sale, the clerk slides an item (e.g., pizza box 120) under the cameras 116 of the item recognition system 102, the item recognition system 102 identifies the item 120 using visual recognition, and the item 120 is added to the ticket of customer 112. The customer 112 may then take the item 120 from the hand of the clerk since the item has already been registered.

The item 120 may be recognized when the item is not in motion under the cameras or as the item is passed under the cameras. Thus, the clerk 108 may, in one natural motion, slide the item under the cameras 116 and hand the item 120 to the customer 112. The clerk 108 does not need to interact with a cash register to enter the kind of item or the price of the item. The system is fast and easy to use for both clerk 108 and customer 112.

In some example embodiments, a first display 130 shows the item registered to the clerk, and a second display 131 shows the information about the item to the customer 131. Additionally, a sound (e.g., a short beep) may be played to show a successful recognition. If the item is detected but not recognized, an error sound may be played as well as an error message on display 130. After all items have been registered, the customer 112 may finish the transaction on the card reader 132.

The item recognition system 102 may include a base 128, a post section 106 on one side of the base 128, and a top section 104 above the post section 106. The base 128 is used for optionally supporting items during the item recognition operations, and a scale 126 in the base 128 may be used for weighing items.

A plurality of cameras 116 take images of the recognition space defined above the base 128. The display 130 is used to present user interfaces, such as user interfaces for configuring the item recognition system 102 or for presenting messages to clerk or customer at the checkout counter. The example illustrated in FIG. 1A shows a second display facing the customer 112. In other example embodiments, only one display may be used.

The card reader 132 is for receiving credit card information. Although a stripe card reader is illustrated, the card reader 132 may also collect credit card information in other ways, such as a credit card chip reader or an interface to obtain payment information from a smart phone.

A light source 110 (e.g., compact fluorescent tubes, bulbs, light-emitting diodes, etc.) on the top section 104 may be configured to substantially illuminate the items for recognition. A calibration pattern 114 defined on the top surface of the base 128 is utilized for calibrating the cameras used for item recognition. The calibration pattern 114 may include various colors such as red, green, blue, white, black, and other shades or combinations, and the calibration pattern 114 may be in any shape such as squares, color wheels, or any other kind of shape.

FIGS. 1A-1C illustrate the checkout sequence. FIG. 1A shows the beginning of the motion by the clerk to slide the item 120 under the cameras (e.g., pass through the recognition space). FIG. 1B shows that the item is now above the center of the base 128 as the clerk 108 slides the item 120 towards the customer 112.

FIG. 1C shows the item 120 leaving the recognition area. The arrow 142 illustrates the motion of the item 120 as the item 120 is moved through the recognition area being held by the hand of the clerk 108.

Although recognizing the item 120 is easy and fast by moving the item 120 above the base 128, it is also possible to hold the hand still and have the item be recognized without being in motion, or even lay the item 120 on the base 128 for recognition.

Other automated checkout solutions track users throughout a store and keep track of the items purchased by identifying where in the store the customer is picking up each item. The store keeps track of the item locations and identifies where customers take the items in order to add the item to the purchase list. But these solutions require tracking a complete store, tracking the movement of customers, and having a very accurate inventory of shelves. For example, a store may require tens or hundreds of cameras to monitor the whole store. Also, the store must track whether a customer puts back an item on the shelf after inspection in order to avoid marking false sales.

The implementations presented herein do not require tracking customers and or having an exact location of items on the shelves. The simple item recognition process makes checking out a fast operation that improves customer satisfaction by reducing the amount of time required to check out, which also decreases considerably the checkout lines.

Figure 2:
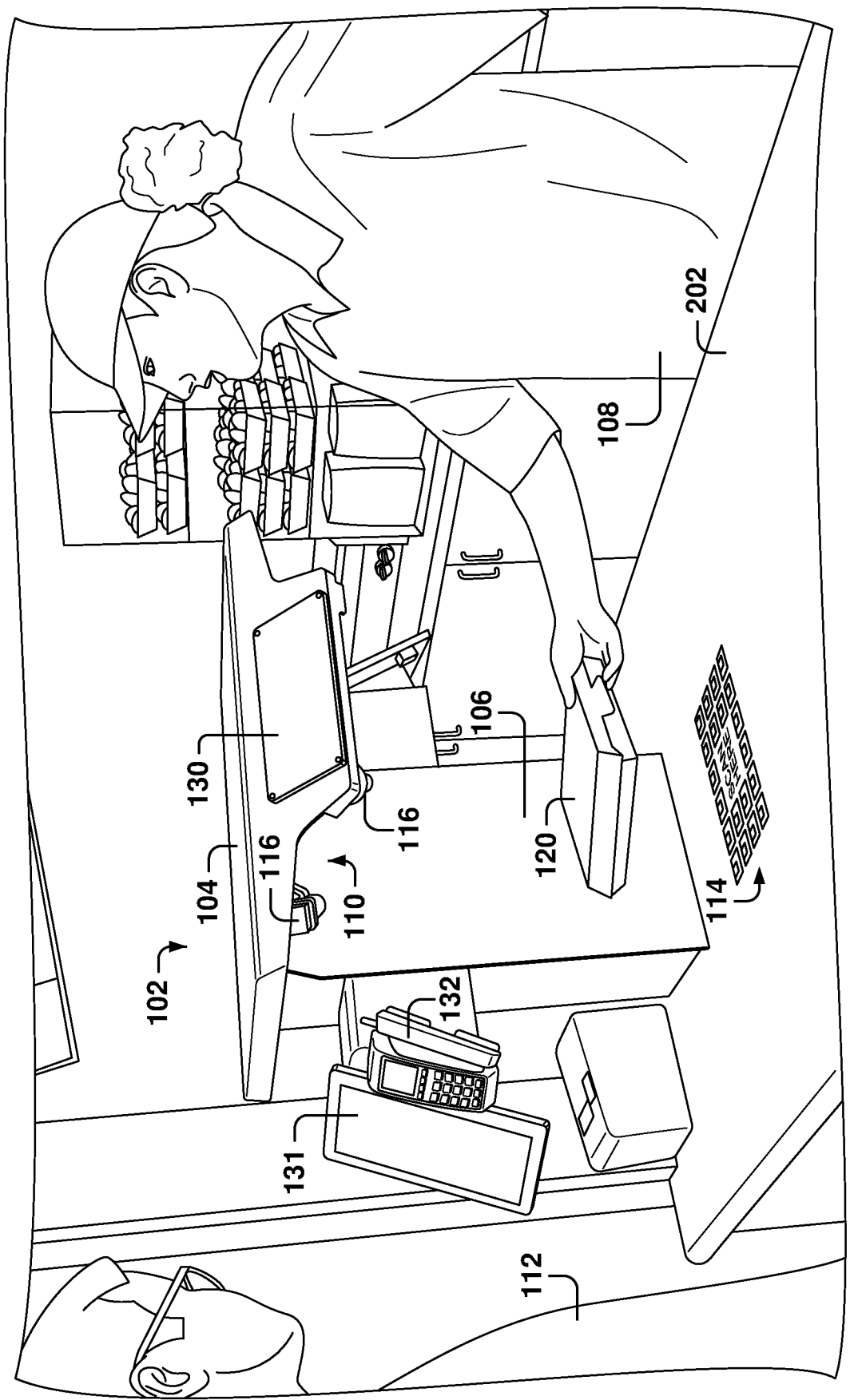
FIG. 2 shows a checkout counter with an embedded item-recognition apparatus, according to some example embodiments.

FIG. 2 shows a checkout counter with an embedded item-recognition apparatus, according to some example embodiments. In some example embodiments, the base of the item recognition system 102 is the counter 202, such that the post section 106 is placed on top of the counter 202. In some example embodiments, the calibration pattern 114 may be imprinted directly on the counter 202. In other embodiments, there may not be a calibration pattern 114, or the calibration pattern may be simple square or rectangle that shows the clerk 108 where the recognition space is.

In other example embodiments, the cameras and the illumination system may also be placed higher above the counter 202, maybe even hanging from the ceiling without the need for a post section 106. The person skilled in the art would readily appreciate other ways to accommodate the cameras and the lighting to define the recognition space where items may be scanned. Many combinations may be achieved, as long as the one or more cameras 116 are situated in a way that good resolution pictures may be taken, where the good resolution enables the accurate image recognition to be performed. For example, cameras may also be situated on or under the counter to take images of the item 120, or one or more cameras 116 may be placed on the post section 106, or any combination thereof.

Figure 3:
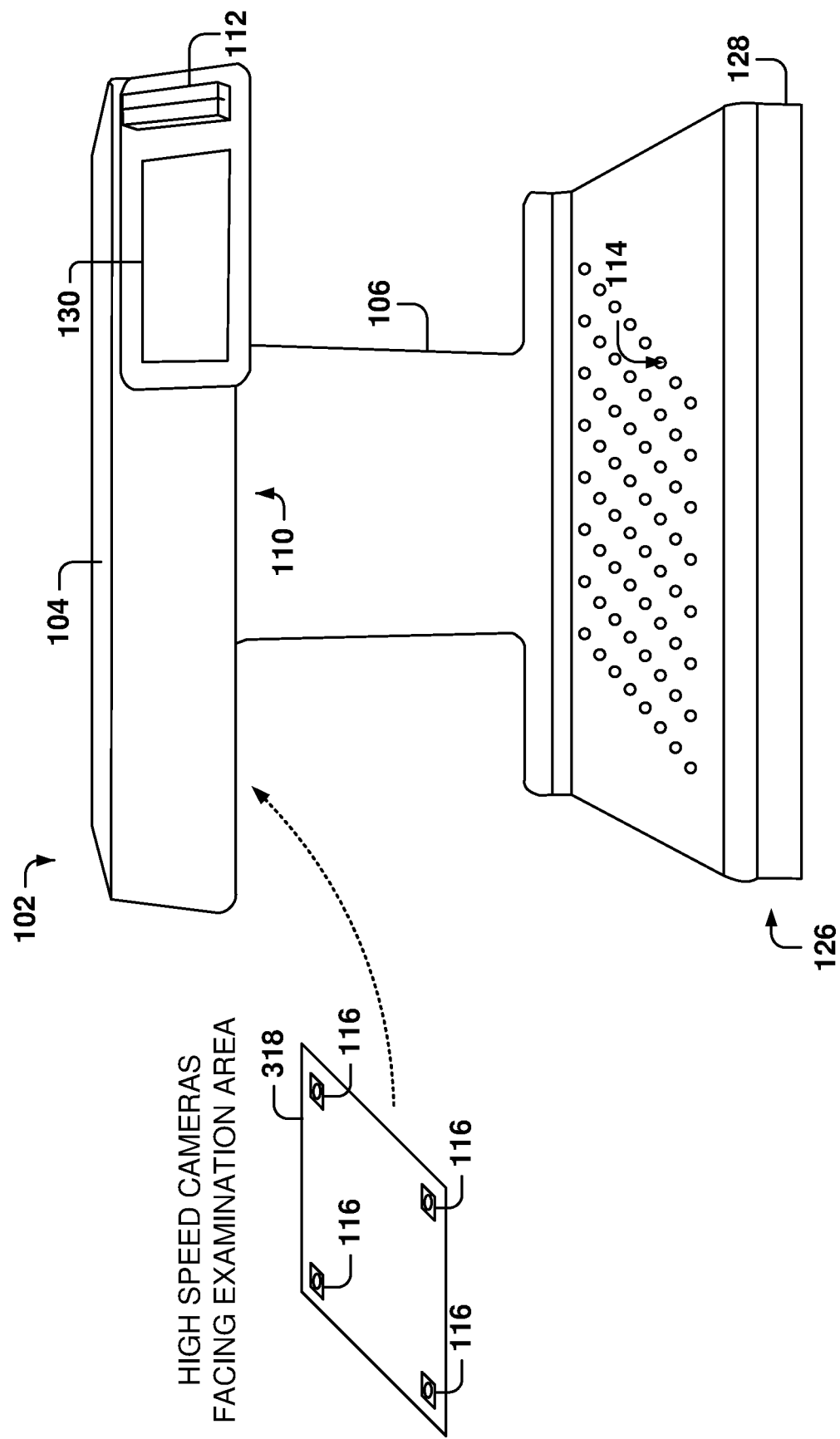
FIG. 3 illustrates an item recognition system, according to one example embodiment.

The FIG. 3 illustrates an item recognition system 102, according to one example embodiment. Some embodiments are disclosed in the context of automated item recognition for a checkout system, referred to herein as a kiosk, e.g., in a cafeteria or a grocery counter, but the principles for item recognition may be utilized in other scenarios that may benefit from visually recognizing items. Examples of such scenarios may include, but are not limited to, self-checkout of products by customers in supermarkets, restaurants, or coffee shops; multi-product packaging of diverse products in a packaging plant; product quality control in a manufacturing plant; advanced driver assistance systems such as automatic parking systems; public surveillance systems; and automated teller machines (ATMs).

In some example embodiments, a plurality of cameras 116 are positioned on the bottom surface 318 of the top section 104. In some example embodiments, the number of cameras is in the range from 2 to 30 cameras or more. In other embodiments, additional cameras 116 may be also be placed on the post section 106 or on the base 128. In the example illustrated in FIG. 3, four high-speed 2D cameras are placed on, or near, the corners of the bottom surface 318 of the top section 104. The use of high-speed cameras 116 enables the ability of scanning items on-the-fly, while the items are in motion, without having to place the items on the base 128.

The high-speed cameras 116 may continuously take pictures of the item recognition area above the base 128. For example, each camera 116 may take 130 images, also referred to herein as frames, per second, although other frequencies are possible, such as frequencies between 1 and 500 frames per second.

In other embodiment, the cameras 116 may be 3D cameras that may be of different types; although they may be situated near each other, they may provide different visual information based on the 3D technology utilized. Further yet, in some embodiments, a mix of 2D and 3D cameras may be used and the information captured by the different cameras may be combined for item recognition.

It is to be noted that the embodiments illustrated in FIG. 3 are examples and do not describe every possible embodiment. Other embodiments may have different shapes, place cameras in different positions, place illumination sources in different positions, and so forth. The embodiments illustrated in FIG. 3 should therefore not be interpreted to be exclusive or limiting, but rather illustrative.

Figure 4:
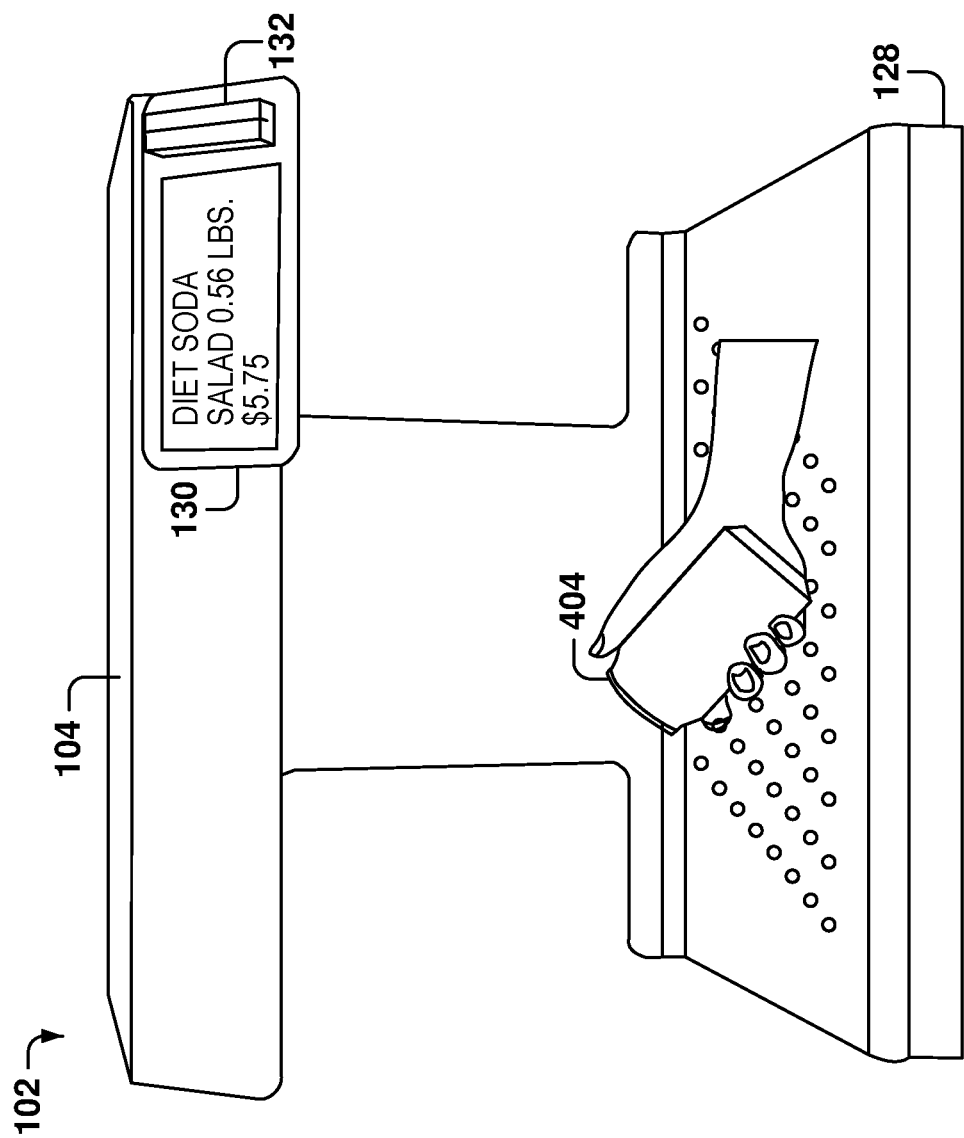
FIG. 4 illustrates the scanning of items for recognition, according to some example embodiments.

FIG. 4 illustrates the scanning of items for recognition, according to some example embodiments. During item recognition, items such as a soda can 204 are scanned as the hand slides the item over the examination area. Of course, it is also possible to place the soda can 204 on the base 128 for examination.

More than one item at a time may be recognized (e.g., several items placed on a tray), and if more than one item is present, the item recognition system 102 creates separate models for each of the items before they are submitted to an item recognition program. Further, the items do not have to be placed on a predetermined location of the base 128, with a predetermined orientation (e.g., standing on their side or standing on their bottom), or with a bar code aiming in a certain direction. The system 102 does not rely on barcodes to recognize the items, but rather the system 102 analyzes the shape, color, and dimensions of the item to determine its identity, although if a barcode is detected, the barcode may also be used for recognition. In other words, since the barcode is part of the appearance of the item, the barcode is used for item recognition as part of the overall appearance of the item. However, item recognition does not rely on identifying the barcode and then searching a database that maps the found barcode to a known categorized item.

It is to be noted that some items may be easier to recognize, such as the soda can 404, because they only have one type of packaging or appearance. However, other items, such as salads, may have many variations. For example, salads may have different color combinations, different volumes, different arrangements of components, etc. Therefore, recognizing a salad may require thousands of salad images, for training the machine-learning program used to recognize images, that account for different presentations of the salad, including color variations, different lighting conditions, different volume, different ingredients, etc.

Figure 5:
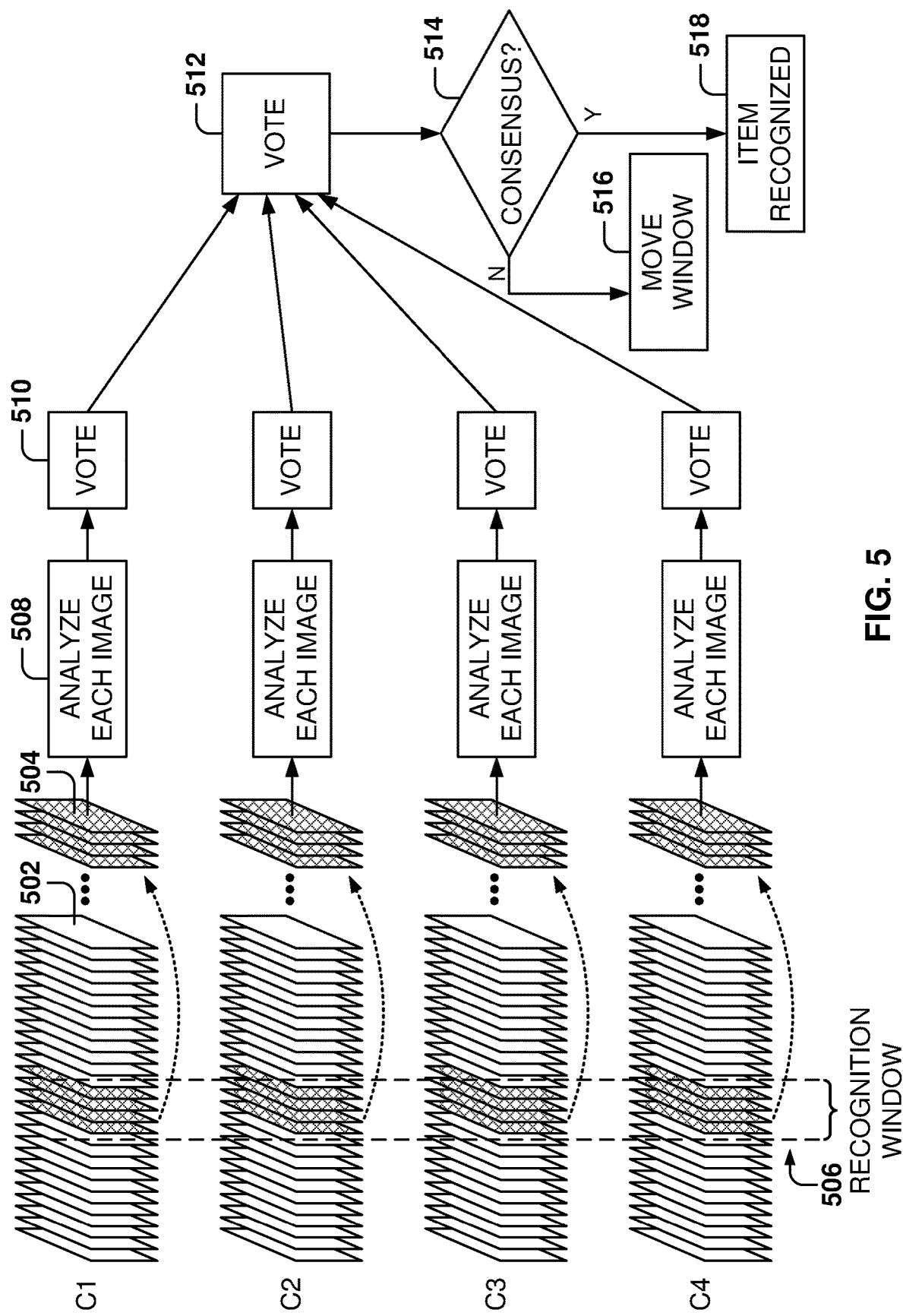
FIG. 5 illustrates the process for coordinating the information from multiple cameras to recognize items, according to some example embodiments.

FIG. 5 illustrates the process for coordinating the information from multiple cameras to recognize items, according to some example embodiments. In this example, four cameras, C1-C4, are continuously taking pictures of the examination area.

As an item (and a hand that may be holding it) enters the item recognition area, the cameras detect the item and wait for a small period of time until the complete item has entered the space of the examination area. This helps avoid false identification of items. For example, a store may sell a hot dog and a plate, and a hot dog with French fries on the plate. If image recognition starts too early, only the hot dog may be detected on a plate that also has French fries.

A recognition window 506 is defined for identifying the item. The recognition window 506 defines a period of time for item recognition. Thus, the recognition window 506 includes one or more frames 502 from each of the cameras, where the frames in the recognition window 506 are those frames that are taken within the period of time defined by the recognition window 506. The frames 504 taken within the recognition window are referred to herein as recognition frames 504. For example, the recognition window 506 may define a period of time that includes four frames for each of the cameras, but other embodiments may utilize recognition windows that encompass 1 to 20 frames or more.

The images from the selected recognition frames 504 in the recognition window 506 are then analyzed (in an operation 508) for each camera. In some example embodiments, a machine-learning classifier is utilized to analyze each frame. In some example embodiments, the examination area is the area above the base of the checkout apparatus. Therefore, before the analysis, any image information captured outside the examination area is removed from the frame; that is, only the area above the four corners of the base (or a part of it) is examined.

Further, in some example embodiments, the image of the base is also removed from the picture. In other embodiments, the image of the base is treated as another item, which includes training the machine-learning program for item recognition with images of the base section and the pattern printed on the base section. More details regarding the use of a machine-learning program for item recognition are described below with reference to FIG. 13.

The result from analyzing each frame may be "item recognized" or "item not recognized." In other example embodiments, the result may also include "no item detected in the recognition area," or some error condition.

For each camera, a first voting process takes place (operation 510) where the results from each frame are compared. For example, if all the four frames recognize the same item, then the result of the vote is "item X detected," where X is the identifier of the item detected; otherwise, the result is "no item recognized." In other embodiments, different voting mechanisms may be used, such as three of the four frames must recognize the same item, etc. More details regarding the first voting process are provided below with reference to FIG. 7.

A second voting operation takes place (operation 512) to combine the results from all the cameras. For example, if at least two cameras recognize the same item, without any of the other cameras recognizing a different item, then the result is that the item has been detected. Otherwise, an item is not recognized. A hand may be covering a given camera given the angle of view of the camera, but other cameras may have a better view of the item. That's why, in some example embodiments, majority voting is not required to determine that an item has been detected. More details regarding the second voting process are provided below with reference to FIG. 8.

At operation 514, a check is made to determine if there is consensus among the information provided by the different cameras. If a consensus is reached, then the item is recognized (operation 518), and if the consensus is not reached, then the recognition window is moved forward (operation 516) to repeat the recognition process. The recognition window may be moved forward by one or more frames. In some example embodiments, the recognition window is moved forward by the same number of frames as the size of the recognition window, but in other sample embodiments, the recognition window may be moved by a different number of frames, such as sliding the window by 1 to 100 frames or more.

Figure 6:
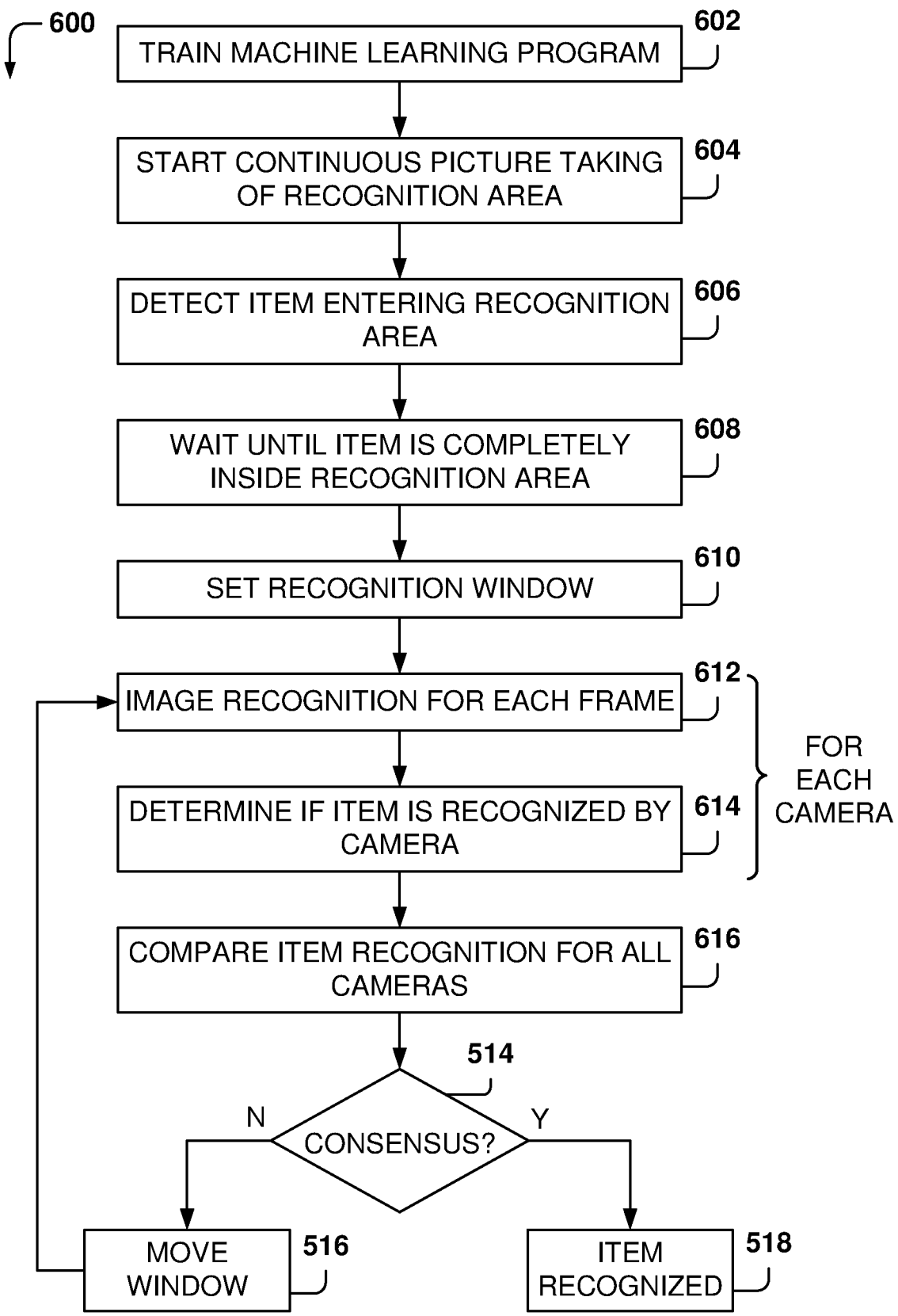
FIG. 6 is a flowchart of a method for item recognition from multiple high-speed cameras, according to some example embodiments.

FIG. 6 is a flowchart of a method 600 for item recognition by multiple high-speed cameras, according to some example embodiments. While the various operations in this flowchart are presented and described sequentially, one of ordinary skill will appreciate that some or all of the operations may be executed in a different order, be combined or omitted, or be executed in parallel.

At operation 602, the machine-learning program is trained with images of known items. In some example embodiments, the user is prompted to obtain images of an item multiple times, in different positions. In addition, the training process includes adding variations of the captured images for the given item (e.g., can of soda, salad, apple) to generate hundreds or thousands of images for each item, until enough images are available for a reliable training of the machine-learning program.

The training may include taking images of items placed on the tray or items as they are scanned on-the-fly. Of course, the on-the-fly process may capture many more images of the item, which allows for more information for the training process. In some example embodiments, the training process includes training the kiosk by taking pictures without any item in the examination space to train for the surface printed on the base.

Further, in some example embodiments, images of hands as they slide through the examination area are taken as to be able to recognize a hand as just another item. Of course, during recognition, any recognition of the hand or the base area is discarded and not considered for determining that an item has been identified.

From operation 602, the method 600 flows to operation 604 where the item-recognition process begins by continuous picture taking of the recognition area by the multiple cameras. The process continues until an item is detected as entering the recognition area at operation 606. The item may be detected when the view of the examination area changes, such as when the pattern on the base is not completely in view.

At operation 608, the recognition process is delayed until the item has entered the recognition area. The item may completely enter the recognition area, or a large enough part of the item (e.g., 90%) to reliably identify the item. The delay is justified because if image recognition is started right at the time that the item enters the recognition area, then the whole item may not be available for recognition.

At operation 610, a recognition window is identified for starting the item-recognition process. From operation 610, the method 600 flows to operation 612. Operations 612 and 614 are performed for each of the cameras. At operation 612, each frame in the recognition window is analyzed to determine if an item is recognized in the image of the frame. At operation 614, the information from all the frames captured by the same camera is analyzed to determine if a positive identification of an item has been reached. More details regarding operation 614 are provided below with reference to FIG. 7.

At operation 616, the results of the item recognition for all the cameras in the recognition window are compared to check if all, or some, of the cameras have identified the same item. In operation 514, a check is made to determine if there is consensus among the detection from each of the cameras. More details about operation 514 are provided below with reference to FIG. 8.

If a consensus is reached, the method 600 flows to operation 518, and if the consensus is not reached, the method 600 flows to operation 516. At operation 516, the recognition window is moved (e.g., slid forward) a predetermined number of frames and the method 600 goes back to operation 612 to repeat the item recognition process. Of course, if an object is not detected and the recognition area becomes empty again, the process goes back to operation 604 to wait for the next scan.

At operation 518, a determination is made that an item has been recognized. The information is then stored in memory. Additionally, the information may be presented on one or more displays indicating the item, or items, identified, which may include item name and price. After the item is recognized, scanning stops until the examination space is empty again.

Figure 7:
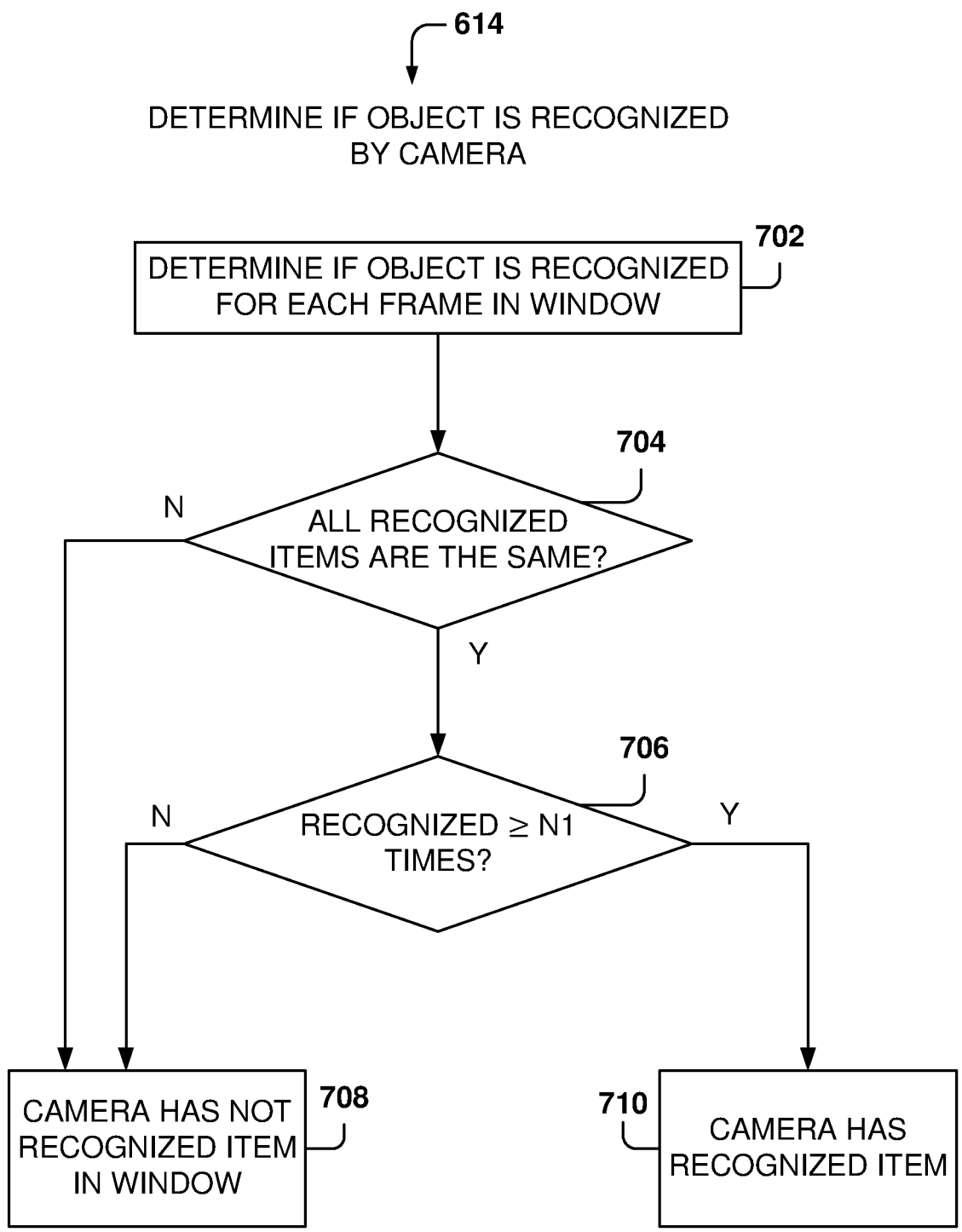
FIG. 7 is a flowchart of a method for determining if an item is recognized by one of the multiple high-speed cameras, according to some example embodiments.

FIG. 7 is a flowchart of a method for determining if an item is recognized by one of the cameras of the multiple high-speed cameras, according to some example embodiments. While the various operations in this flowchart are presented and described sequentially, one of ordinary skill will appreciate that some or all of the operations may be executed in a different order, be combined or omitted, or be executed in parallel.

At operation 702, the image-recognition process, determines if an object has been detected in each frame of the recognition window. From operation 702, the method flows to operation 704 where a check is made that all the items recognized are of the same item. If all the items recognized are the same item, the method flows to operation 706. However, if there is a discrepancy in one or more of the items, the method flows to operation 708. For example, if one camera recognizes one item and a different camera recognizes a different item, then the process is considered inconclusive and the recognition is not completed. It is possible that one camera may not recognize any items (e.g., the view for that camera does not provide a good view of the item), but that would not terminate the recognition process. However, if different cameras recognize different items, then the recognition is not successful.

At operation 706, a check is made to determine if the number of times the item is recognized is greater than or equal to a predetermined threshold Ni. The threshold determines the amount of recognitions required for a positive identification. Different embodiments may utilize different thresholds. For example, in one embodiment, one recognition is enough, while in other embodiments at least two recognitions are required.

The threshold $N_1$ is a tunable parameter that depends on the resolution provided by the cameras, the number of cameras, the number of frames in the recognition window, etc.

If the number of recognitions is greater than or equal to the threshold $N_1$, the method flows to operation 710, and to operation 708 otherwise. At operation 708, a determination is made that the camera has not recognized an item in the recognition window. At operation 710, a determination is made that the camera has recognized the item.

Figure 8:
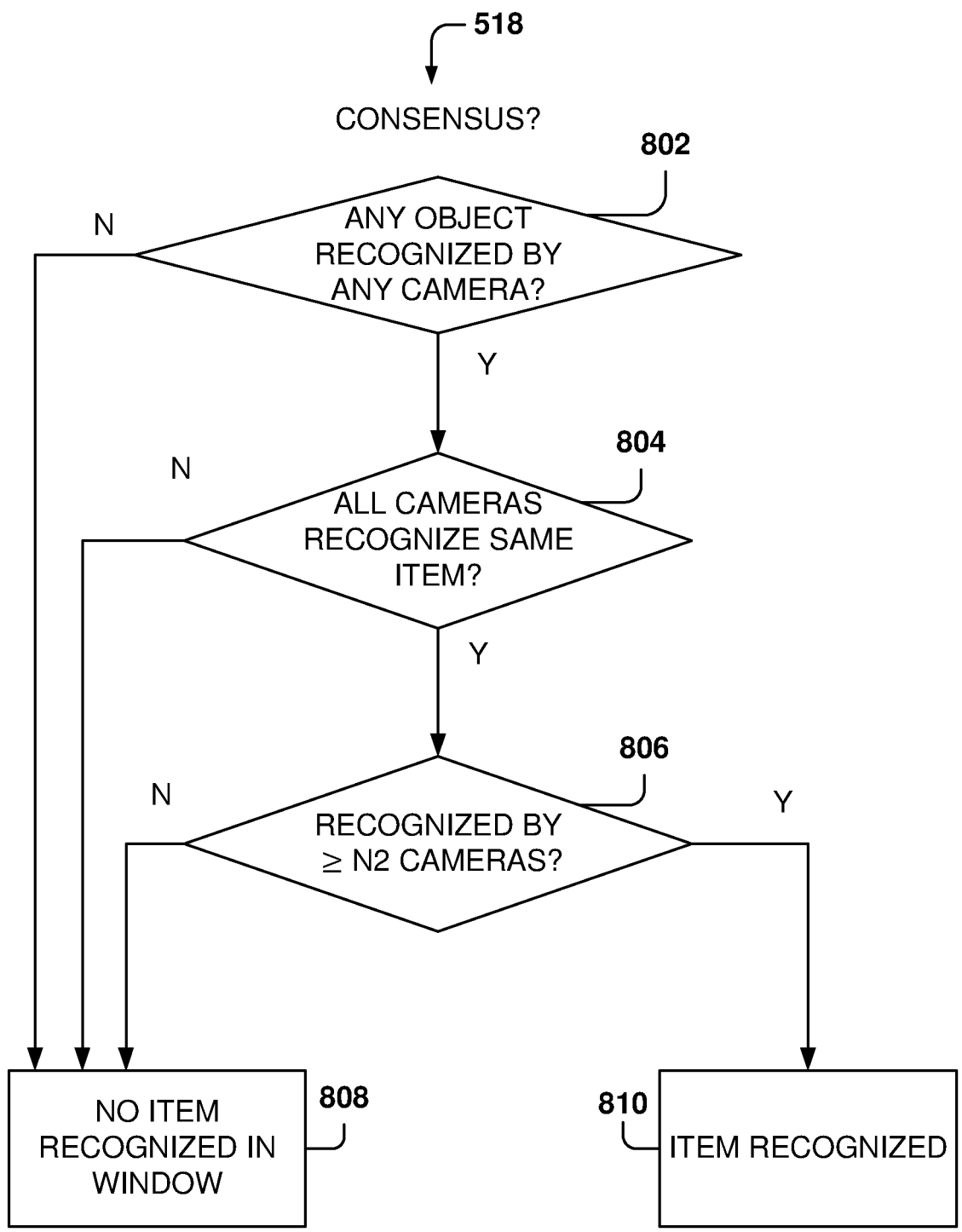
FIG. 8 is if flowchart of a method for determining if there is consensus among the decisions from each of the cameras to recognize an item, according to some example embodiments.

FIG. 8 is a flowchart of a method for determining if there is consensus (operation 514 of FIGS. 5 and 6) among the decisions from each of the cameras to recognize an item, according to some example embodiments. While the various operations in this flowchart are presented and described sequentially, one of ordinary skill will appreciate that some or all of the operations may be executed in a different order, be combined or omitted, or be executed in parallel.

At operation 802, a check is made to determine if any object has been recognized by any of the cameras. If at least one object has been recognized, the method flows to operation 804. If no object has been recognized, the method flows to operation 808, where a determination is made that no item has been recognized in the recognition window.

At operation 804, a check is made to determine if all the cameras have recognized the same item. If all the cameras recognize the same item, the method flows to operation 806. If not all the cameras recognize the same item, the method flows to operation 808 to determine that no item has been recognized in the recognition window.

At operation 806, a check is made to determine if the item has been recognized at least $N_2$ times. $N_2$ is a threshold indicating the minimum amount of cameras that must recognize the item for a positive identification. The range of $N_2$ varies from one camera to all cameras, and $N_2$ is a tunable parameter that is tunable based on the performance of the system according to the number of cameras, quality of the cameras, lighting conditions, etc. In one embodiment, at least two of the four cameras must recognize the same item for a positive identification.

If the number of positive identifications is greater than or equal to $N_2$, the method flows to operation 810, where a determination is made that the item has been recognized. Otherwise, the method flows to operation 808 for a negative result.

Figure 9:
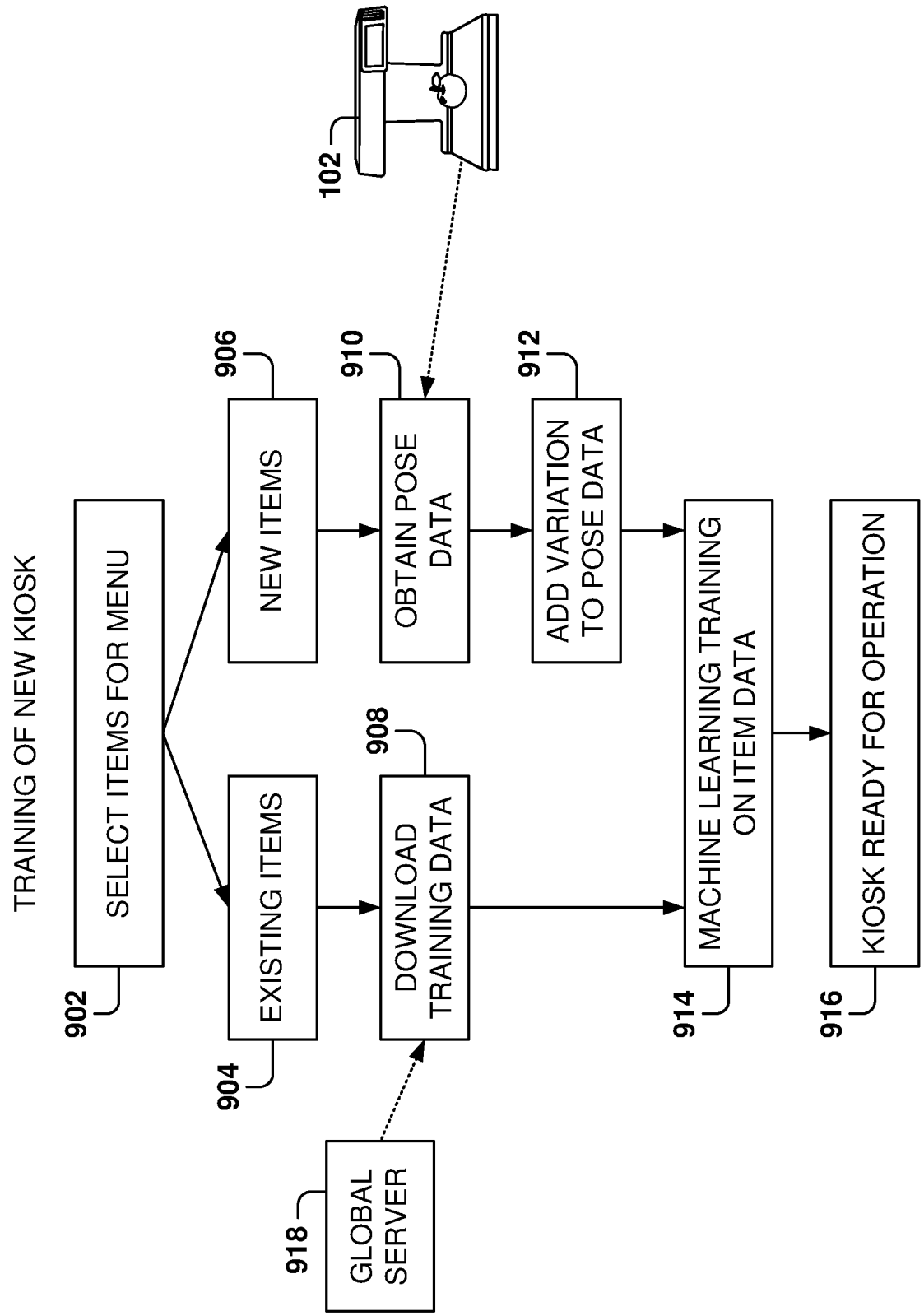
FIG. 9 is a flowchart of a method for training a new kiosk to prepare for image-based recognition, according to some example embodiments.

FIG. 9 is a flowchart of a method for training a new kiosk to prepare for image-based recognition, according to some example embodiments. In some example embodiments, a global server 918 includes a global database with information about items and images of those items. When a new item is added to a kiosk, it is possible to leverage the existing information on the global server 918 to add new items; otherwise, new images of the item are used for training.

The training of the new kiosk (e.g., item recognition system 302) starts at operation 902, where the user is provided a user interface for selecting which items will be in the menu of recognizable items. In some example embodiments, a prerecorded configuration of items may be loaded into the kiosk 102 and the user does not have to manually enter each item.

The items at the kiosk may be existing items 904 or new items 906. The existing items 904 are those items that are already recorded in the global database. For existing items 904, at operation 908, the training data for those items is downloaded from the global server 918. Therefore, no recording of poses is required for these items. In general, kiosks belonging to the same company tend to use the same items in the menu, so it is easier to initialize those kiosks. There may be some variation because of the addition of local items, but those items tend to be a very small percentage of the total number of recognizable items.

There may be 10,000 images of salads, as people make all kinds of salads, and all that information is recorded to improve image-based recognition. In fact, there could be two kinds of salads, and image-based recognition would be able to differentiate between the two types of salads.

For new items 906, at operation 910, pose data is obtained at the item recognition system 102. For example, 50 different poses are recorded at the item recognition system 102. In addition to the images taken, the training set is augmented by creating variations of the captured images at operation 912. For example, variations may be created by adding shadows, changing brightness, adding a partial block to the image, adding artificial shine, adding artificial lines, changing colors slightly, etc. This way, it is possible to go from 50 images to thousands of images, which enables adequate training of the machine-learning program for item recognition.

For example, there is a new item recognition system 102 to be installed, and the item recognition system 102 is initially configured to recognize salads and a soda can. Data for salads is available in the global server 918, but the soda can is a new item 906 and there is no data for it. The item recognition system 102 is connected to the network and the data for the salad is downloaded from the global server 918. On the other hand, the data for the soda can is generated by capturing images of the soda can. In this case, pose data has to be captured for just one item instead of two.

Later, another item recognition system 102 is to be installed that is able to recognize salads, the soda can, and pizza boxes that are already in the global database. Now, the three items are already in the global database. Therefore, to prepare this item recognition system 102 for operation, all the data may be downloaded from the global server 918, thus avoiding the need to generate the pose images.

At operation 914, the machine-learning program is trained with the data for the selected items, which has been either downloaded from the global server 918 or obtained via image capture of item poses. In machine learning, item recognition accuracy depends on the number of images available for training. Further, the more diverse the conditions for the captured images, the better the images are for recognition accuracy. Therefore, having image data with different types of lightning, positions, reflections, shadows, etc., helps improve accuracy. In general, thousands of images are desired to obtain a good accuracy level for image-based recognition.

Diversity is especially important for items without a fixed look, such as salads, pasta dishes, sushi, fruit, etc. On the other hand, manufactured items that have consistent packaging may not need as much variation because their look is consistent. Two salads will not look the same, but a soda can will always look the same. This is why image variety is important and having thousands of sample images is best for accuracy.

In some example embodiments, training data is also captured for hands, either hands by themselves or holding an item. There may be a lot of variety in hands, given different colors, rings, nails, sleeve clothing, etc. A large number of images for many types of hands are then captured to train the hand as a separate object that can be identified as any other item. This way, when a hand is detected in a frame, the hand is removed before proceeding with the recognition of the item that the hand is holding.

After the machine-learning program in the item recognition system 102 has been trained, at operation 916, the item recognition system 102 is ready for operation. New locations may be launched very quickly because it is not necessary to record all the items again. As the database grows, the number of items that need to be recorded will be less and less.

Figure 10A:
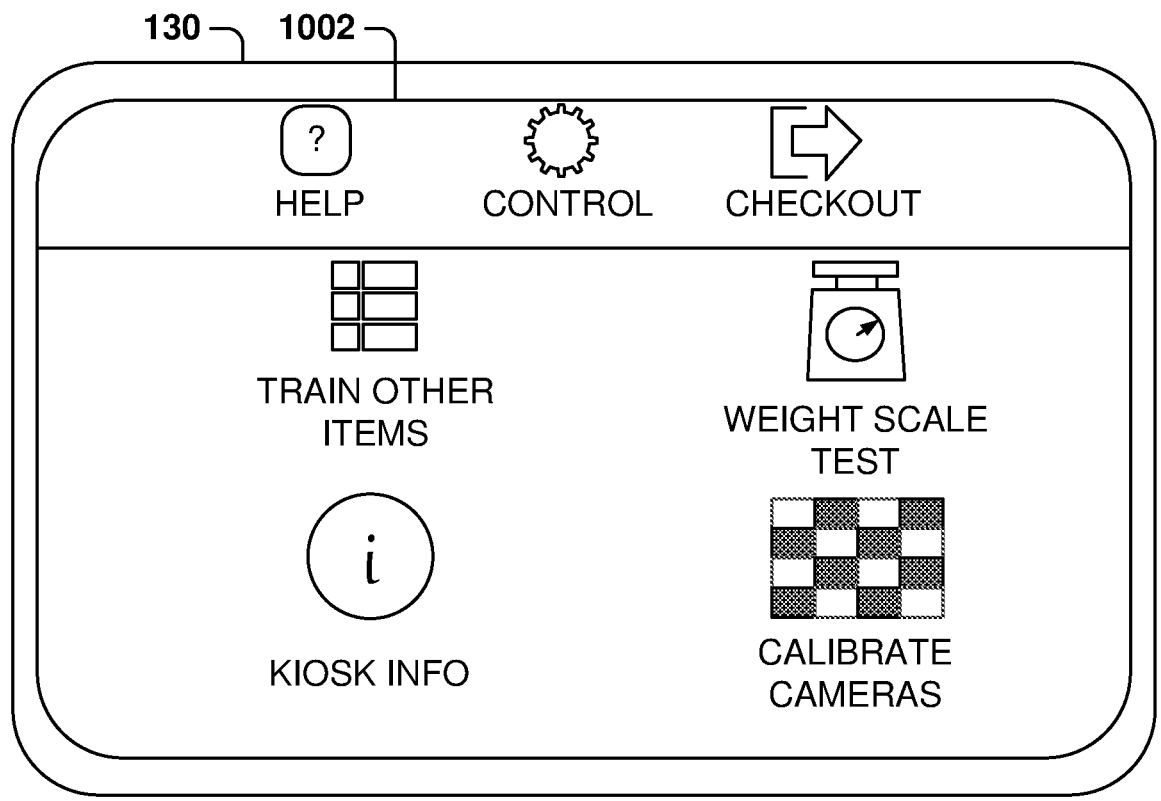
FIG. 10A is a screenshot of a user interface for the main menu of the checkout stand, according to some example embodiments.

FIG. 10A is a screenshot of a management user interface 1002 for the main menu of the checkout stand, according to some example embodiments. The user interface 1002 is presented on the display 130 and provides several options to the user. The options include getting help, accessing control settings, proceeding to checkout mode, training items, performing a weight scale test, obtaining kiosk info (e.g., identification, installation date, transaction summaries, transaction data, etc.), and performing a camera calibration operation.

When the operator of the kiosk wishes to add a new item to the menu, the "train other items" option may be selected. The kiosk will guide the user through one or more user-interface screens to configure the new item, which may be downloaded from the global database or recorded at the kiosk.

Figure 10B:
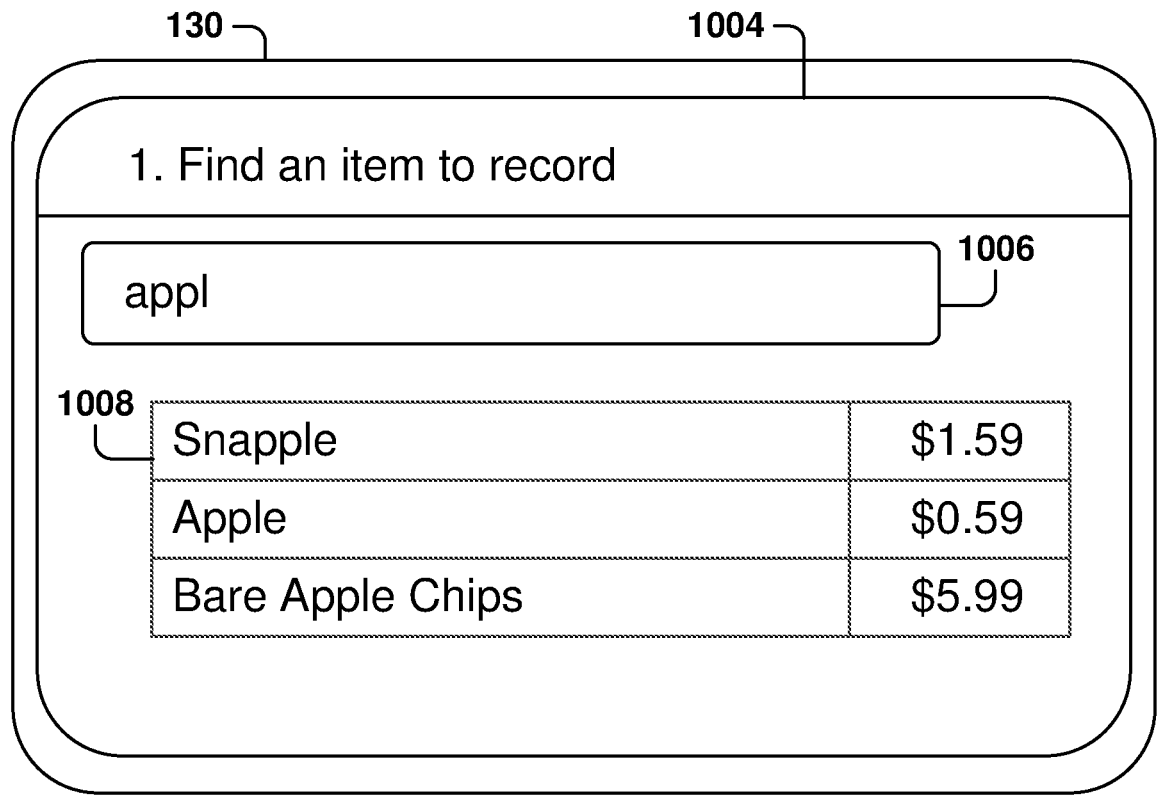
FIG. 10B is a screenshot of a user interface for finding an item to configure, according to some example embodiments.

FIG. 10B is a screenshot of a user interface 1004 for finding an item to configure, according to some example embodiments. The user interface 1004 is presented on the display 130 and provides a search option for adding the new item. A search box 1006 allows the user to enter a search query. Results 1008 are presented below the search box 1006.

The user may then select one of the existing items or select to train a new item. If the user selects an existing item, the user may configure the item (e.g., accept the suggested price or enter a new price) and then add it to the menu.

Figure 11:
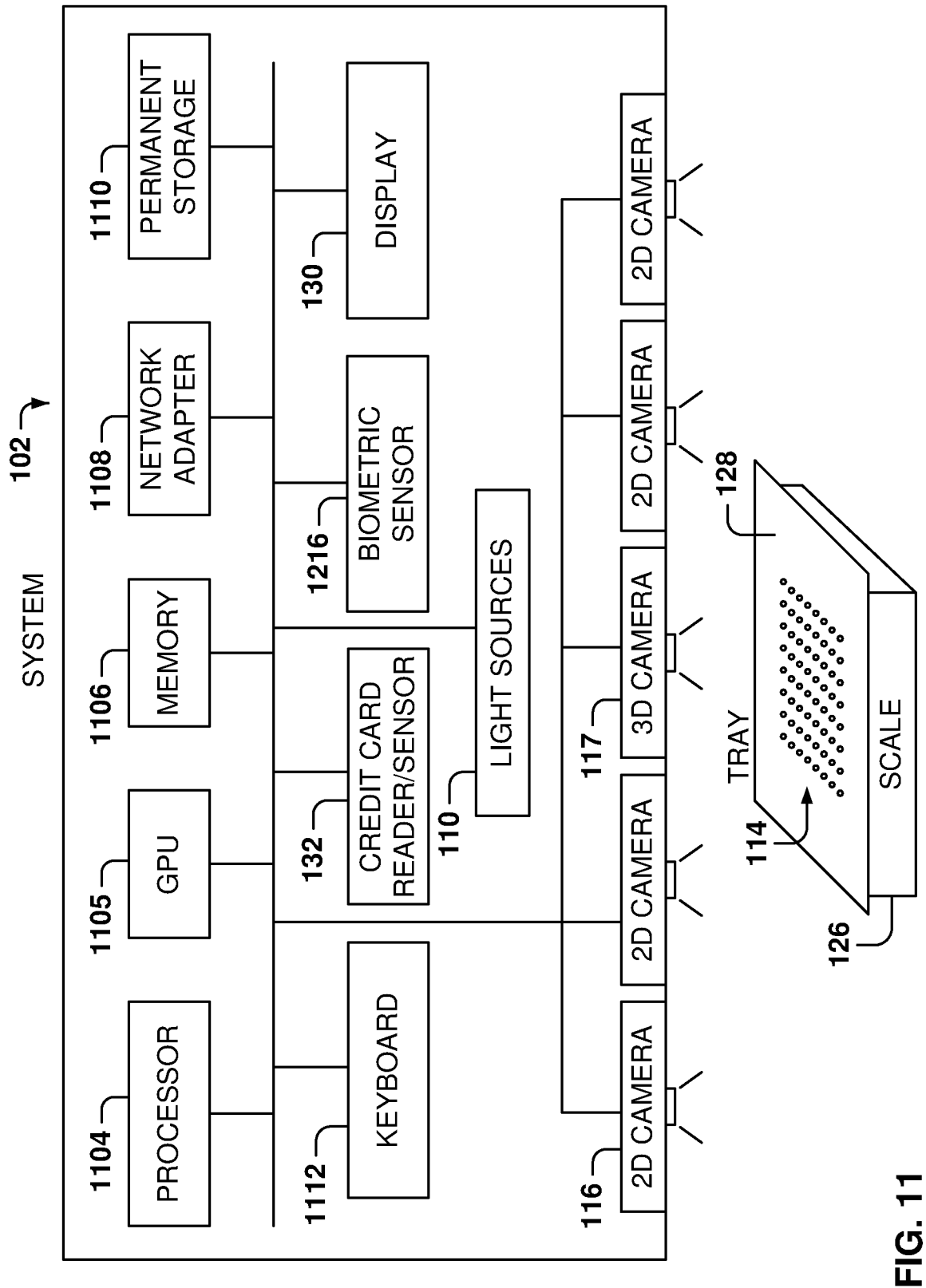
FIG. 11 illustrates the components of the item recognition system, according to an example embodiment.

FIG. 11 illustrates the components of the item recognition system 102, according to an example embodiment. In some example embodiments, the item recognition system 102 includes a processor 1104 for executing computer instructions of the programs described herein, a graphics processing unit (GPU) 1105, a memory 1106 for storing digital data (e.g., image capture data), a network adapter 1108, and permanent storage 1110. The GPU 1105 includes a plurality of cores and a GPU memory, and the GPU cores may also execute the computer instructions of the programs described herein.

The network adapter 1108 provides wired or wireless communications to connect the item recognition system 102 to a network (e.g., the Internet) or to other devices, such as user smart phones, tablets, and the like. The network adapter 1108 may support standard Internet protocols (e.g., TCP/IP, UDP, 802.x) and other protocols for local communications, such as Bluetooth®, Wi-Fi®, infrared or ultrasonic device protocols, credit card protocols, Body Area Network protocols, and so forth. The permanent storage 1110 may store computer programs or computer data, such as 2D and 3D item models and system configuration parameters.

The item recognition system 102 further includes a keyboard 1112, a card reader 132, one or more biometric sensors 1216, one or more displays 130 (which may include a touchscreen), and one or more light sources 110. The keyboard 1112 may be used to enter data, such as configuration data or item descriptions. The card reader 132 is used for reading credit card information, which may be transmitted to a remote location via the network adapter 1108. The biometric sensor 1116 is used to capture user information, such as a fingerprint or a retina scan. The one or more displays 130 are used to present information, such as an item name, item description, item price, item weight, total due, and the like. The one or more light sources 110 may be distributed across a certain volume in order to provide adequate illumination to items placed in the volume of interest for recognizing the items (e.g., over the base 318).

The item recognition system 102 further includes a plurality of cameras, which may be 2D cameras 116 and/or 3D cameras 117, the base 128, and a scale 126 for weighing items placed on the base 128. The 2D cameras 116 may be high-speed, continuous rolling cameras, and the 3D cameras 117 may be of different types, such as a stereo camera, a structured-light camera, a range camera, and so forth. Different types of cameras may be used simultaneously because the calibration process enables transforming the data from all of the cameras into a compatible format to build item models.

In general, each type of 3D camera 117 has strengths and weaknesses. By combining at least two of the different types of 3D cameras 117, it is possible to leverage their respective strengths. In some example embodiments, four stereo cameras and one structured-light 3D camera are utilized, but other embodiments may utilize other camera combinations.

In some example embodiments, other types of cameras may also be used, such as infrared cameras, depth cameras, ultraviolet cameras, cameras, and the like. Information provided by each camera is combined with the information provided by the other cameras, although some cameras may only provide depth information or color information.

In some example embodiments, the top surface of the base 128 includes a calibration pattern 114 used for calibrating the cameras 116, 117. In some example embodiments, the calibration pattern 114 includes a plurality of circles arranged on a grid pattern. However, other embodiments may utilize other patterns, as long as the pattern is known by the item recognition system 102. For example, the pattern may include one or more rectangles, a photograph, one or more triangles, or combinations of different shapes, such as rectangles, circles, triangles, and so forth.

It is to be noted that the calibration pattern 114 does not have to be visible during item recognition, because the pattern is needed for the calibration phase. For example, a user may place a cafeteria tray on the base 128 and the item recognition system 102 will proceed to identify the items on the base 128, such as a bottle, a can, a bag of chips, a plate with a salad, and so forth. In some example embodiments, once the items are recognized, the system 102 may calculate a total bill based on the respective prices of the identified items. Further, the system 102 may ask the user to place a salad plate separately on the base 128 in order to weigh a salad that is priced by weight.

It is to be noted that the embodiments illustrated in FIG. 11 are examples and do not describe every possible embodiment. Other embodiments may utilize fewer components or additional components. The embodiments illustrated in FIG. 11 should therefore not be interpreted to be exclusive or limiting, but rather illustrative.

Figure 12:
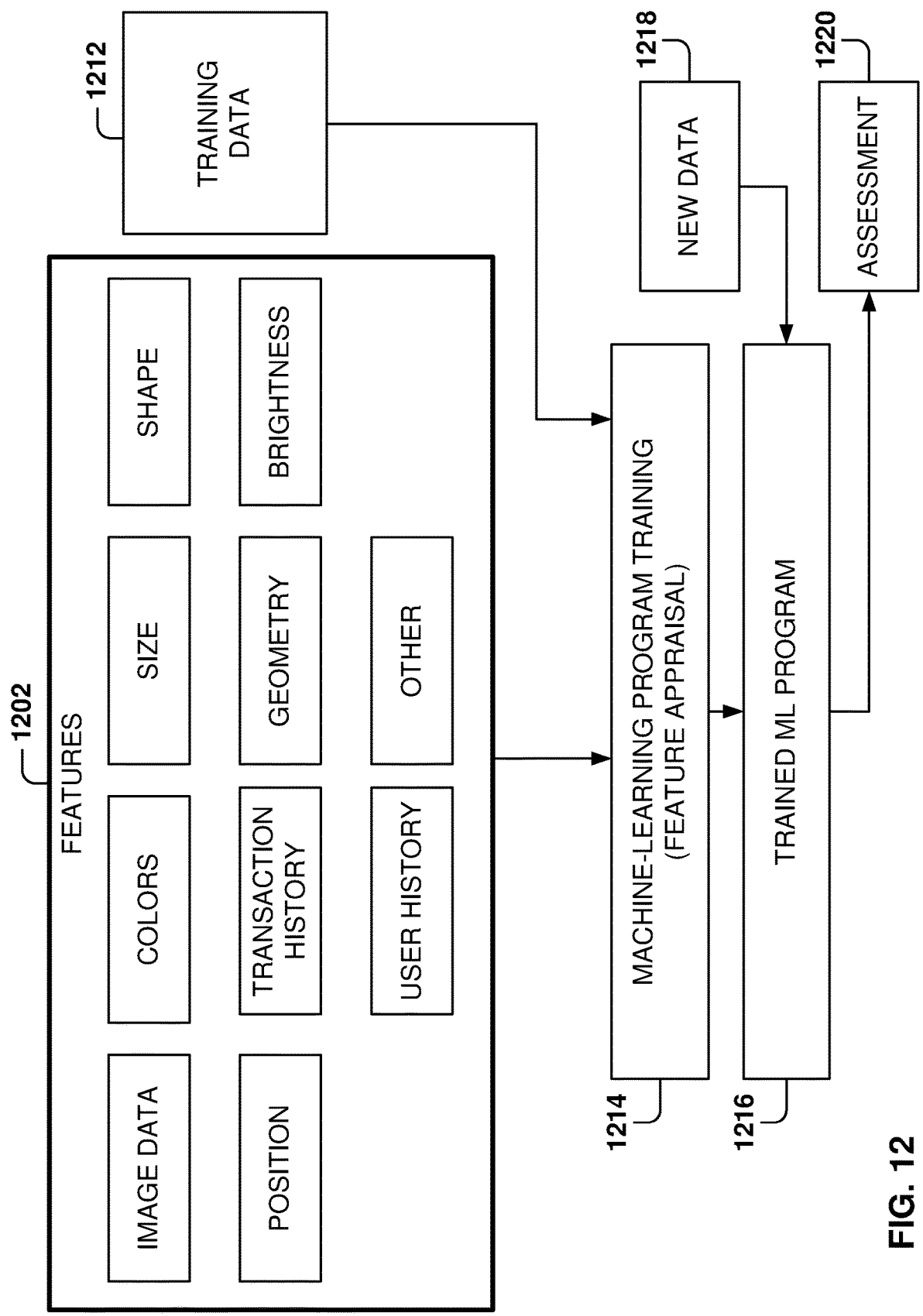
FIG. 12 illustrates the training and use of a machine-learning program, according to some example embodiments.

FIG. 12 illustrates the training and use of a machine-learning program, according to some example embodiments. In some example embodiments, machine-learning programs (MLPs), also referred to as machine-learning algorithms or tools, are utilized to perform operations associated with image-based recognition.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 1212 to make data-driven predictions or decisions expressed as outputs or assessments 1220. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for image-based recognition.

Two common types of problems in machine learning are classification problems and regression problems. Classification problems, also referred to as categorization problems, aim at classifying items into one of several category values (for example, is this item an apple or an orange?). Regression problems aim at quantifying some items (for example, by providing a value that is a real number).

In some embodiments, example machine-learning algorithms are used at the kiosk to perform image-based recognition. If several items are detected in the examination space, the items are separated, and separate geometric models of each item are created. The machine-learning algorithms utilize the training data 1212 to find correlations among identified features 1202 that affect the outcome.

The machine-learning algorithms utilize the features 1202 for analyzing the data to generate assessments 1220. A feature 1202 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 1202 may be of different types and may include one or more of image data, colors, size, shape, position, transaction history, geometry (e.g., 3D point cloud, 3D mesh), brightness, user history, and others. The machine-learning algorithms utilize the training data 1212 to find correlations among the identified features 1202 that affect the outcome or assessment 1220. In some example embodiments, the training data 1212 includes known data for one or more identified features 1202 and one or more outcomes, such as captured images of items and the corresponding item identifications.

With the training data 1212 and the identified features 1202, the machine-learning tool is trained at operation 1214. The machine-learning tool appraises the value of the features 1202 as they correlate to the training data 1212. The result of the training is a trained machine-learning program 1216.

When the trained machine-learning program 1216 is used to perform an assessment, new data 1218 is provided as an input to the trained machine-learning program 1216, and the trained machine-learning program 1216 generates the assessment 1220 as output. For example, when an item is placed in the examination space, the captured image data, and other derived data (e.g., geometric models), are used to identify the item. In some example embodiments, the training data 1212 includes the pose data and the transaction data captured for the item, as described above.

Figure 13:
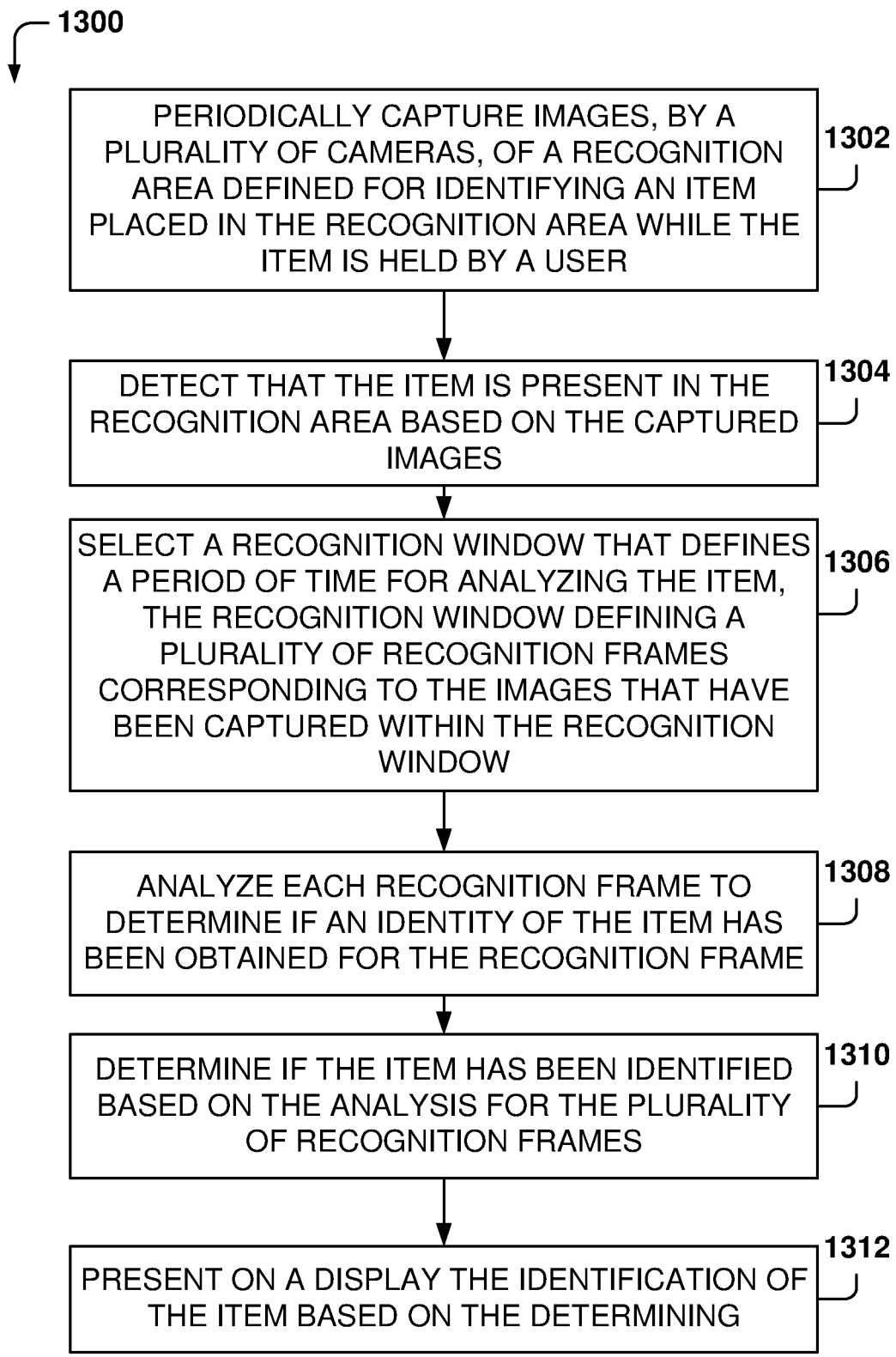
FIG. 13 is a flowchart of a method for on-the-fly image recognition of an item in motion, according to some example embodiments, for performing damage simulations.

FIG. 13 is a flowchart of a method 1300 for on-the-fly image recognition of an item in motion, according to some example embodiments. While the various operations in this flowchart are presented and described sequentially, one of ordinary skill will appreciate that some or all of the operations may be executed in a different order, be combined or omitted, or be executed in parallel.

Operation 1302 is for periodically capturing images, by a plurality of cameras, of a recognition area defined for identifying an item placed in the recognition area while the item is held by a user.

From operation 1302, the method 1300 flows to operation 1304 where one or more processors detect that the item is present in the recognition area based on the captured images.

From operation 1304, the method 1300 flows to operation 1306 for selecting, by the one or more processors, a recognition window that defines a period of time for analyzing the item. The recognition window defines a plurality of recognition frames corresponding to the images that have been captured within the recognition window.

From operation 1306, the method 1300 flows to operation 1308 where the one or more processors analyze each recognition frame to determine if an identity of the item has been obtained for the recognition frame, the analyzing comprising performing image recognition of the recognition frame to identify the item based on, at least, a shape of the item and coloring of the item.

From operation 1308, the method 1300 flows to operation 1310 for determining, by the one or more processors, if the item has been identified based on the analysis for the plurality of recognition frames.

From operation 1310, the method 1300 flows to operation 1312 for presenting on a display the identification of the item based on the determining.

In one example, determining if the item has been identified further includes, for each camera, performing a first voting based on whether the item has been identified in each of the recognition frames of the camera, and determining if the camera has identified the item based on the first voting for the camera.

In one example, determining if the item has been identified further includes performing a second voting, for the cameras from the plurality of cameras, based on the determining if each camera has identified the item; and determining if the item has been identified based on the second voting.

In one example, the item is identifiable as the item is in motion within the recognition area.

In one example, the item is identifiable as a hand holding the item stops within the recognition area.

In one example, image recognition of each frame is performed by a machine-learning program, the machine-learning program having been trained for each identifiable item with a plurality of images of the identifiable item.

In one example, analyzing each recognition frame further includes separating, in the recognition frame, the item from a hand holding the item.

In one example, the plurality of cameras are high-definition cameras continuously capturing images of the recognition area at a predefined frequency.

In one example, the method 1300 further includes: when the item has not been identified, defining a new recognition window; and repeating the analyzing and the determining if the item has been identified with the new recognition window.

In one example, the recognition window corresponds to a number of images from each camera in a range from 2 to 10, wherein each camera captures images at a frequency in a range from 20 to 500 frames per second.

Figure 14:
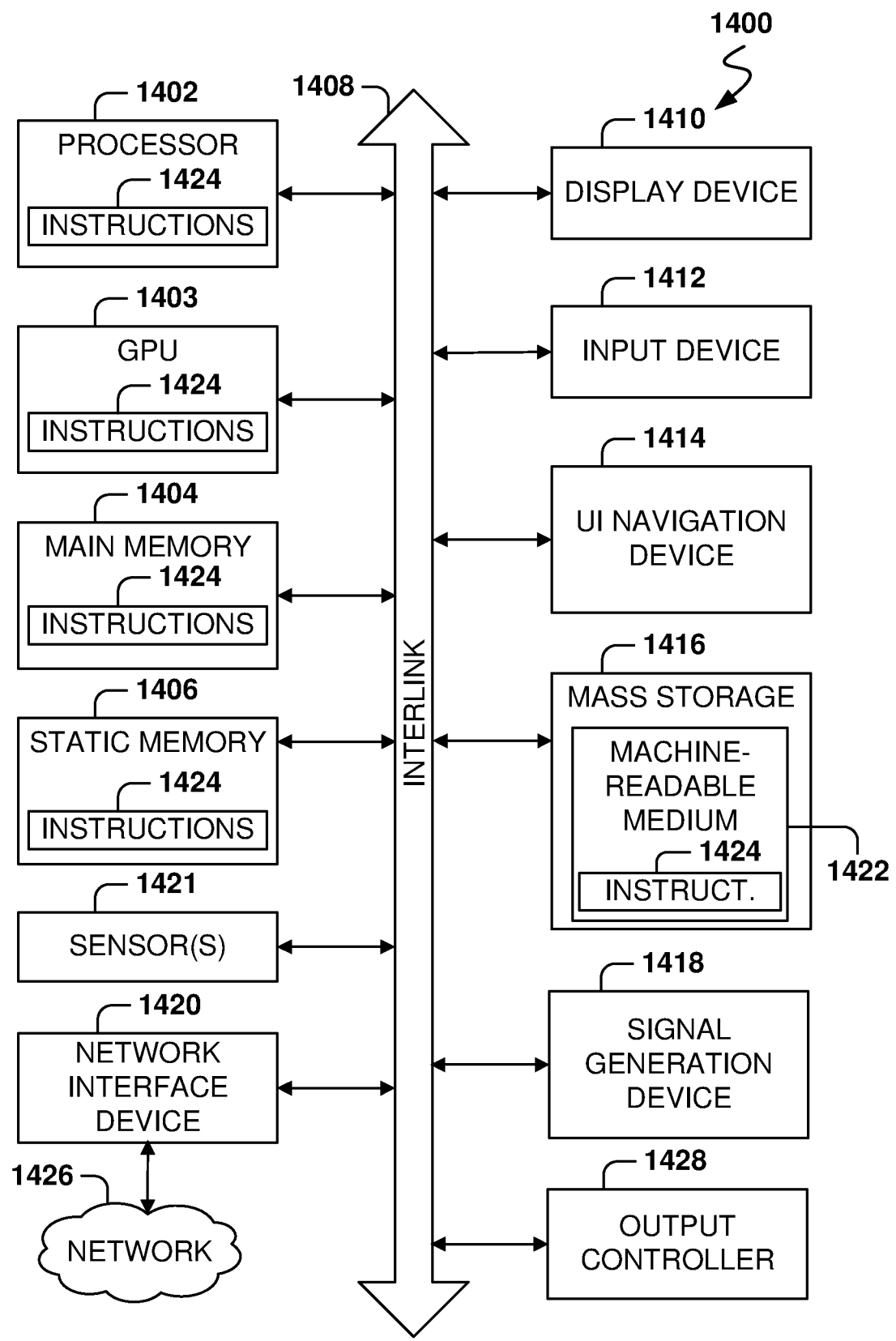
FIG. 14 is a block diagram illustrating an example of a machine upon which one or more example embodiments may be implemented. In alternative embodiments, the machine may operate as a standalone device or may be connected (e.g., networked) to other machines.

FIG. 14 is a block diagram illustrating an example of a machine 1400 upon which one or more example embodiments may be implemented. In alternative embodiments, the machine 1400 may operate as a standalone device or may be connected (e.g., networked) to other machines. In a networked deployment, the machine 1400 may operate in the capacity of a server machine, a client machine, or both in server-client network environments. In an example, the machine 1400 may act as a peer machine in a peer-to-peer (P2P) (or other distributed) network environment. The machine 1400 may be a personal computer (PC), a tablet, a set-top box (STB), a mobile telephone, a web appliance, a network router, a network switch, a network bridge, or any machine capable of executing instructions (sequential or otherwise) that specify actions to be taken by that machine. Further, while only a single machine 1400 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant massed particles, etc.) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1400 may include a hardware processor 1402 (e.g., a central processing unit (CPU), a hardware processor core, or any combination thereof), a graphics processing unit (GPU) 1403, a main memory 1404, and a static memory 1406, some or all of which may communicate with each other via an interlink (e.g., bus) 1408. The machine 1400 may further include a display device 1410, an alphanumeric input device 1412 (e.g., a keyboard), and a user interface (UI) navigation device 1414 (e.g., a mouse). In an example, the display device 1410, alphanumeric input device 1412, and UI navigation device 1414 may be a touch screen display. The machine 1400 may additionally include a mass storage device (e.g., drive unit) 1416, a signal generation device 1418 (e.g., a speaker), a network interface device 1420, and one or more sensors 1421, such as a Global Positioning System (GPS) sensor, compass, accelerometer, or another sensor. The machine 1400 may include an output controller 1428, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The mass storage device 1416 may include a machine-readable medium 1422 on which is stored one or more sets of data structures or instructions 1424 (e.g., software) embodying or utilized by any one or more of the techniques or functions described herein. The instructions 1424 may also reside, completely or at least partially, within the main memory 1404, within the static memory 1406, within the hardware processor 1402, or within the GPU 1403 during execution thereof by the machine 1400. In an example, one or any combination of the hardware processor 1402, the GPU 1403, the main memory 1404, the static memory 1406, or the mass storage device 1416 may constitute machine-readable media.

While the machine-readable medium 1422 is illustrated as a single medium, the term "machine-readable medium" may include a single medium or multiple media (e.g., a centralized or distributed database, and/or associated caches and servers) configured to store the one or more instructions 1424.

The term "machine-readable medium" may include any medium that is capable of storing, encoding, or carrying instructions 1424 for execution by the machine 1400 and that cause the machine 1400 to perform any one or more of the techniques of the present disclosure, or that is capable of storing, encoding, or carrying data structures used by or associated with such instructions 1424. Non-limiting machine-readable medium examples may include solid-state memories, and optical and magnetic media. In an example, a massed machine-readable medium comprises a machine-readable medium 1422 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1424 may further be transmitted or received over a communications network 1426 using a transmission medium via the network interface device 1420 utilizing any one of a number of transfer protocols (e.g., frame relay, Internet Protocol (IP), Transmission Control Protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, and wireless data networks (e.g., Institute of Electrical and Electronics Engineers (IEEE) 802.11 family of standards known as Wi-Fi®, IEEE 802.16 family of standards known as WiMax®, IEEE 802.15.4 family of standards, and P2P networks, among others). In an example, the network interface device 1420 may include one or more physical jacks (e.g., Ethernet, coaxial, or phone jacks) or one or more antennas to connect to the communications network 1426. In an example, the network interface device 1420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions 1424 for execution by the machine 1400, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    periodically capturing images, by a plurality of cameras, of a recognition area defined for identifying an item placed in the recognition area while the item is held by a user;
    detecting, by one or more processors, that the item is present in the recognition area based on the captured images;
    selecting, by the one or more processors, a recognition window that defines a period of time for analyzing the item, the recognition window defining a plurality of recognition frames corresponding to the images that have been captured within the recognition window;
    analyzing, by the one or more processors, each recognition frame to determine if an identity of the item has been obtained for the recognition frame, the analyzing comprising performing image recognition of the recognition frame to identify the item based on, at least, a shape of the item and coloring of the item;
    determining, by the one or more processors, if the item has been identified based on the analysis for the plurality of recognition frames; and
    presenting on a display the identification of the item based on the determining.

2. The method as recited in claim 1, wherein determining if the item has been identified further includes:
for each camera, performing a first voting based on whether the item has been identified in each of the recognition frames of the camera; and
for each camera, determining if the camera has identified the item based on the first voting for the camera.

3. The method as recited in claim 2, wherein determining if the item has been identified further includes:
performing a second voting, for the cameras from the plurality of cameras, based on the determining if each camera has identified the item; and
determining if the item has been identified based on the second voting.

4. The method as recited in claim 1, wherein the item is identifiable as the item is in motion within the recognition area.

5. The method as recited in claim 1, wherein the item is identifiable as a hand holding the item stops within the recognition area.

6. The method as recited in claim 1, wherein image recognition of each frame is performed by a machine-learning program, the machine-learning program having been trained for each identifiable item with a plurality of images of the identifiable item.

7. The method as recited in claim 1, wherein analyzing each recognition frame further includes:
separating, in the recognition frame, the item from a hand holding the item.

8. The method as recited in claim 1, wherein the plurality of cameras are high-definition cameras continuously capturing images of the recognition area at a predefined frequency.

9. The method as recited in claim 1, further comprising:
when the item has not been identified, defining a new recognition window; and
repeating the analyzing and the determining if the item has been identified with the new recognition window.

10. The method as recited in claim 1, wherein the recognition window corresponds to a number of images from each camera in a range from 2 to 10, wherein each camera captures images at a frequency in a range from 20 to 500 frames per second.

11. A system comprising:
a plurality of cameras for periodically capturing images of a recognition area defined for identifying an item placed in the recognition area while the item is held by a user;
a display;
a memory comprising instructions; and
one or more computer processors, wherein the instructions, when executed by the one or more computer processors, cause the one or more computer processors to perform operations comprising:
detecting that the item is present in the recognition area based on the captured images;
selecting a recognition window that defines a period of time for analyzing the item, the recognition window defining a plurality of recognition frames corresponding to the images that have been captured within the recognition window;
analyzing each recognition frame to determine if an identity of the item has been obtained for the recognition frame, the analyzing comprising performing image recognition of the recognition frame to identify the item based on, at least, a shape of the item and coloring of the item;
determining if the item has been identified based on the analysis for the plurality of recognition frames; and
presenting on the display the identification of the item based on the determining.

12. The system as recited in claim 11, wherein determining if the item has been identified further includes:
for each camera, performing a first voting based on whether the item has been identified in each of the recognition frames of the camera; and
for each camera, determining if the camera has identified the item based on the first voting for the camera.

13. The system as recited in claim 12, wherein determining if the item has been identified further includes:
performing a second voting, for the cameras from the plurality of cameras, based on the determining if each camera has identified the item; and
determining if the item has been identified based on the second voting.

14. The system as recited in claim 11, wherein image recognition of each frame is performed by a machine-learning program, the machine-learning program having been trained for each identifiable item with a plurality of images of the identifiable item.

15. The system as recited in claim 11, wherein analyzing each recognition frame further includes:
separating, in the recognition frame, the item from a hand holding the item.

16. A non-transitory machine-readable storage medium including instructions that, when executed by a machine, cause the machine to perform operations comprising:
periodically capturing images, by a plurality of cameras, of a recognition area defined for identifying an item placed in the recognition area while the item is held by a user;
detecting that the item is present in the recognition area based on the captured images;
selecting a recognition window that defines a period of time for analyzing the item, the recognition window defining a plurality of recognition frames corresponding to the images that have been captured within the recognition window;
analyzing each recognition frame to determine if an identity of the item has been obtained for the recognition frame, the analyzing comprising performing image recognition of the recognition frame to identify the item based on, at least, a shape of the item and coloring of the item;
determining if the item has been identified based on the analysis for the plurality of recognition frames; and
presenting on a display the identification of the item based on the determining.

17. The non-transitory machine-readable storage medium as recited in claim 16, wherein determining if the item has been identified further includes:
for each camera, performing a first voting based on whether the item has been identified in each of the recognition frames of the camera; and
for each camera, determining if the camera has identified the item based on the first voting for the camera.

18. The non-transitory machine-readable storage medium as recited in claim 17, wherein determining if the item has been identified further includes:
performing a second voting, for the cameras from the plurality of cameras, based on the determining if each camera has identified the item; and
determining if the item has been identified based on the second voting.

19. The non-transitory machine-readable storage medium as recited in claim 16, wherein image recognition of each frame is performed by a machine-learning program, the machine-learning program having been trained for each identifiable item with a plurality of images of the identifiable item.

20. The non-transitory machine-readable storage medium as recited in claim 16, wherein analyzing each recognition frame further includes:
   separating, in the recognition frame, the item from a hand holding the item.

* * * * *